(12) United States Patent
Iwaya

(10) Patent No.: US 8,319,595 B2
(45) Date of Patent: Nov. 27, 2012

(54) COIL APPARATUS

(75) Inventor: Kimiaki Iwaya, Hokkaido (JP)

(73) Assignee: Cosmo Mechanics Co., Ltd., Hokkaido (JP)

( * ) Notice: Subject to any disclaimer, the term of this patent is extended or adjusted under 35 U.S.C. 154(b) by 0 days.

(21) Appl. No.: 13/387,325

(22) PCT Filed: Jan. 13, 2010

(86) PCT No.: PCT/JP2010/000145
§ 371 (c)(1),
(2), (4) Date: Jan. 26, 2012

(87) PCT Pub. No.: WO2011/086596
PCT Pub. Date: Jul. 21, 2011

(65) Prior Publication Data
US 2012/0126927 A1    May 24, 2012

(51) Int. Cl.
*H01F 5/00* (2006.01)
(52) U.S. Cl. .................................. 336/200
(58) Field of Classification Search .......... 336/65, 336/83, 200, 206–208, 232, 225
See application file for complete search history.

(56) References Cited

U.S. PATENT DOCUMENTS

| 5,363,280 A | 11/1994 | Chobot et al. |
| 5,473,813 A | 12/1995 | Chobot et al. |
| 5,743,004 A | 4/1998 | Chobot et al. |
| 2006/0022543 A1 | 2/2006 | Takeuchi |
| 2006/0220491 A1 | 10/2006 | Takeuchi |

FOREIGN PATENT DOCUMENTS

| EP | 0 621 747 | 10/1994 |
| EP | 1564864 | 8/2005 |
| JP | 2-86103 | 1/1990 |
| JP | 3-181191 | 8/1991 |
| JP | 6-314876 | 11/1994 |
| JP | 2003-521861 | 7/2003 |
| JP | 3636700 | 10/2003 |
| JP | 3897122 | 3/2007 |
| JP | 2009-303391 | 12/2009 |
| WO | WO 00/49702 | 8/2000 |
| WO | WO 2004/047252 | 6/2004 |

*Primary Examiner* — Tuyen Nguyen
(74) *Attorney, Agent, or Firm* — Notaro, Michalos & Zaccaria P.C.

(57) ABSTRACT

Disc-type coil lamination work is facilitated, and a manufacturing cost is reduced. A plurality of disc-type coils each including a discoid insulating substrate 1, conductor patterns 2 arranged on the insulating substrate 1, and holes 7 configured to form lamination through holes 10 bored in the insulating substrate 1 are laminated by connecting the lamination through holes 10. The holes 7 configured to form the lamination through holes 10 are provided on the outer circumferential side or the inner circumferential side of the conductor patterns 2, and a leading pattern 3 and a terminating pattern 4 serving as terminal portions of each conductor pattern 2 are drawn to the holes 7 and connected, thereby forming the lamination through holes 10.

9 Claims, 16 Drawing Sheets

COIL APPARATUS

TECHNICAL FIELD

The present invention relates to a flat-type coil for use in an electromagnetic induction device having a plurality of disc-type coils laminated therein, and more particularly to a disc-type coil that is useful when incorporated as a stator or a rotor in an induction device. More particularly, the present invention relates to improvement in lamination through hole connections that utilizes through hole connections to achieve electrical conduction of a plurality of disc-type coils to be laminated.

BACKGROUND ART

In recent years, a demand for a disc-type coil having a conductor pattern formed thereon by etching or press work is increasing because of a tendency of reduction in thickness of various devices. However, the disc-type coil has an inconvenience that a value of a current flowing through a coil obtained by winding a wire rod is reduced since there is a limit in a wiring amount of a conductor pattern. Therefore, there is an attempt to increase the wiring amount of the conductor pattern by laminating the disc-type coils and connecting them in series. For example, there has been suggested a coil apparatus having a configuration that many lamination through holes are radially provided in an inner circumferential portion of an insulating substrate of a disc-type coil, a leading end and a terminating end of a conductor pattern are connected to two through holes, which are common to each disc-type coil, in many lamination through holes, and each lower disc-type coil below the uppermost disc-type coil is thereby rotated in accordance with an angle of arrangement of the lamination through holes and then laminated (Patent Literature 1). Each of the plurality of laminated disc-type coils is rotated in accordance with the angle of the arrangement of the lamination through holes in each disc-type coil to effect positioning of the lamination through holes, and then the lamination through holes are soldered to connect the disc-type coils.

In the disc-type coil are provided two types of through holes, i.e., through holes that are arranged on the outer circumferential side of each conductor pattern and connect the conductor patterns on both surfaces to each other and a pair of through holes that are arranged on the inner circumferential side of each conductor pattern and connected to the conductor pattern on the front side and the conductor pattern on the back side to function as a leading end and a terminating end. Further, for example, four disc-type coils of this kind are laminated, a pair of through holes serving as a leading end and a terminating end on the inner circumferential side of the conductor pattern are arranged at an interval of an angle of 36°, and three pairs of through holes, each pair of which serve as a leading end and a terminating end, are arranged on the same circumference at intervals of an angle of 81°. Furthermore, a lower disc-type coil is in phase with an upper disc-type coil at an angle of 81° and sequentially laminated, and through holes serving as a leading end and a terminating end on each disc are soldered as lamination through holes, whereby the conductor patterns of the four laminated disc-type coils form a coil of one independent circuit, thus forming a coil with a long wire length.

CITATION LIST

Patent Literature

Patent Literature 1: Japanese Patent Publication No. 3636700

SUMMARY OF INVENTION

Technical Problem

However, the coil apparatus according to Patent Literature 1 has a problem that lamination work is troublesome and a manufacturing cost is high since the respective disc-type coils must be set in phase with each other in accordance with the angle of the arrangement of the lamination through holes at the time of lamination. Therefore, development of a technology that enables easily and assuredly connecting the conductor patterns of the laminated disc-type coils has been demanded.

Further, connection of the respective disc-type coils is restricted to series connection, and it has no degree of freedom. Therefore, there is a problem that increasing a current capacity or increasing a voltage is difficult even in a situation where the current capacity or the voltage is insufficient in conductor patterns of one disc.

In view of the above-described problems, it is an object of the present invention to provide a coil apparatus configured to facilitate the lamination work for disc-type coils and reduce a manufacturing cost. Furthermore, it is another object of the present invention to provide a coil apparatus configured to increase a degree of freedom in connection at the time of laminating a plurality of disc-type coils.

Solution to Problem

To achieve the object, according to the present invention, there is provided a coil apparatus that laminates a plurality of disc-type coils each having a conductor pattern constituting coils of at least one circuit on a discoid annular insulating substrate and electrically connects the disc-type coils via lamination through holes, which are configured to achieve electrical conduction with other disc-type coils, to use the plurality of laminated disc-type coils as one coil, wherein the plurality of laminated disc-type coils are disc-type coils of one-kind each having a configuration that the conductor pattern and a leading end and a terminating end for each circuit of the conductor pattern are provided at the same positions and the leading end and the terminating end are connected to the lamination through holes via a leading pattern and a terminating pattern, holes configured to form at least the n+1 lamination through holes for n (n is a positive integer) laminated discs are provided in accordance with each circuit in each disc-type coil and arranged at the same positions in a laminating direction on the outer side or the inner side of the conductor pattern of the insulating substrate in a state that the plurality of discs are laminated, positions of the lamination through holes that connect the disc-type coils to be laminated are variable by just changing the positions of the holes configured to form the lamination through holes on the other side to which the leading pattern and the terminating pattern are connected, and the plurality of disc-type coils of one type constitute an arbitrary circuit.

Moreover, it is preferable that the holes configured to form the lamination through holes are congregated in proximity to each other. Additionally, it is preferable that the holes configured to form the lamination through holes are arranged in a flange portion outwardly protruding from an outer circumference of the insulating substrate or a space on the inner circumferential side of the insulating substrate apart from the conductor pattern, and the leading pattern and the terminating pattern are drawn to the flange portion or the space on the inner circumferential side of the insulating substrate.

Further, it is preferable that the conductor pattern of the disc-type coil constitutes one coil by connecting a plurality of conductors, which extend from the inner circumferential side toward the outer circumferential side or from the outer circumferential side toward the inner circumferential side between through hole lands annularly arranged along the inner circumference and the outer circumference of the annular insulating substrate, to through holes in the through hole lands on the outer circumferential side and the through hole lands on the inner circumferential side to be alternately folded back in a wave pattern between a front surface and a back surface of the insulating substrate. Furthermore, it is preferable that the through hole lands on the inner circumferential side of the plurality of conductors constituting the same magnetic pole of the same circuit are arranged to be aligned on a plurality of different concentric circles in the radial direction of the insulating substrate, and a plurality of through holes configured to connect the conductor pattern on the front surface with the conductor pattern on the back surface are formed. Moreover, it is preferable that the conductor pattern of the disc-type coil has a configuration that a plurality of coils including at least one coil connected to the leading pattern and one coil connected to the terminating pattern are formed on one insulating substrate and these coils are connected in series or connected in parallel through a connecting pattern.

Furthermore, it is preferable that the conductor pattern of the disc-type coil has a configuration that a plurality of coils including at least one coil connected to the leading pattern and one coil connected to the terminating pattern are formed on one insulating substrate and these coils are connected in series or connected in parallel through a connecting pattern.

Additionally, it is preferable that the disc-type coils are laminated through an insulating sheet, and the lamination through holes of the plurality of electrically connected disc-type coils are connected via a pin that pierces the insulating sheet and has conductive properties.

Further, it is preferable that the lamination through hole connected to the leading pattern and the lamination through hole connected to the terminating pattern are arranged while displacing hole positions one by one in accordance with each disc-type coil, and all the laminated disc-type coils are sequentially connected in series through a pin having conductive properties.

Advantageous Effects of Invention

According to the coil apparatus of the present invention, the disc-type coils having the same conductor patterns are laminated while fitting magnetic pole positions by just changing the arrangement of the leading pattern and the terminating pattern of each disc-type coil to be laminated, and hence a phase of the conductor patterns in each disc-type coil itself is no longer necessary. That is, to fit positions of magnetic poles of each disc-type coil, the insulating substrate does not have to be rotated, and just laminating these discs as they are can suffice, whereby the lamination work of the disc-type coils can be facilitated and a manufacturing cost can be reduced. Further, since at least the n+1 holes configured to form the lamination through holes are provided with respect to the n discs to be laminated in accordance with each circuit of each disc-type coil, various electrical connection patterns between the disc-type coils can be readily obtained by laminating the disc-type coils at the same position and arbitrary selecting positions of the holes where the terminating pattern is connected to the leading pattern without rotating the disc-type coils having the same conductor pattern, i.e., the disc-type coils of one type to provide a phases. For example, series connection can be obtained by a simple lamination structure that the lamination through holes are sequentially connected while displacing hole positions one by one in accordance with each disc-type coil.

Furthermore, since the conductor patterns of each disc-type coil that is laminated via the lamination through holes connected to the leading pattern and the terminating pattern, the conductor patterns of each disc-type coil to be laminated can have a degree of freedom in connection. That is, an electrical connection relationship between the disc-type coils to be laminated can be freely changed by just changing positions of lamination holes, i.e., positions of the lamination through holes connected to the leading pattern and the terminating pattern. For example, it is possible to achieve connection that the plurality of disc-type coils to be laminated are connected in series or connected in parallel or they are connected both in parallel and in series. As a result, a value of a current flowing through the coils can be increased, a voltage can be raised, or a large current can be assured while securing a high voltage. Therefore, a high-capacity output, which cannot be realized in a conventional disc-type coil apparatus, can be readily attained.

Furthermore, since the same disc-type coils, in which positions of the conductor patterns formed on the insulating substrate and holes configured to form the lamination through holes are equal, can be combined to be used based on the connection that these disc-type coils are connected in series or in parallel or they are connected both in series and in parallel, induction devices having different outputs can be fabricated by changing the number of the coils to be combined, and a cost can be reduced by using the same components (the disc-type coils).

Moreover, in the coil apparatus according to the present invention, when the holes configured to form the lamination through holes are congregated in proximity to each other, the leading pattern, the terminating pattern, and the connection pattern of each disc-type coil are aggregated, thereby reducing a size of the coil apparatus.

Additionally, in the coil apparatus according to the present invention, when the holes configured to form the lamination through holes are arranged in the flange portion protruding toward the outside from the outer circumference of the insulating substrate or in the space on the inner circumferential side of the conductor pattern on the insulating substrate, since the leading pattern, the terminating pattern, and the connecting pattern are drawn to the outer side of the conductor pattern, these patterns can be easily and assuredly connected to the conductor pattern, and the conductor pattern itself can be highly densely formed. Therefore, the high-output coil apparatus can be manufactured at a low cost.

Further, according to the conductor pattern folded back in a wave shape alternately between the front surface and the back surface of the insulating substrate to constitute one coil, the series connection or the parallel connection of the plurality of coils can be facilitated by utilizing the positions of the through hole connections, thereby changing a current or a voltage flowed through each coil without changing the conductor pattern. In particular, in cases where each through hole land on the inner circumferential side has an area expanded in the radial direction of the insulating substrate, an extended line of an outline of the through hole land on the inner circumferential side in the radial direction has a wedge shape that coincides with the center of the insulating substrate, each of the conductor is drawn from an outer end portion of the through hole land on the inner circumferential side in the radial direction, and a plurality of through holes configured to connect the conductor pattern on the front surface with the conductor pattern on the back surface are formed in the radial direction of the insulating substrate, an electrical conduction area of the through hole connections in one through hole land on the inner circumferential side can be expanded without circumferentially expanding each through hole land on the inner circumferential side, and a value of a current flowing in the through hole connections in the entire through hole lands on the inner circumferential side can be increased even though a through hole plating thickness is unchanged. Furthermore, when wiring is installed so as to draw each conductor from an outer end portion of each through hole land on the inner circumferential side in the radial direction, a width of the conductor near the through hole land on the inner circumferential side is equal to that of the through hole land on the inner circumferential side, and a value of the current flowing through the entire conductor pattern is no longer restricted by the conductor width. Moreover, in cases where the through hole lands on the inner circumferential side of the plurality of conductors constituting the same magnetic pole of the same circuit are arranged to be aligned on a plurality of different concentric circles in the radial direction of the insulating substrate and a plurality of through holes configured to connect the conductor pattern on the front surface with the conductor pattern on the back surface are formed, the electrical conduction area of the through hole connections in the through hole lands can be expanded, and a value of the current flowing in the through hole connections in the entire through hole lands can be increased and electrical resistance in the through hole connections can be reduced even though the through hole plating thickness is unchanged.

Furthermore, in the coil apparatus according to the present invention, when the plurality of coils are connected in parallel or in series in one disc-type coil, a current capacity flowed through the conductor patterns of one disc-type coil can be increased, or a voltage can be raised. Moreover, even in each of the disc-type coils having the same conductor patterns, the current value or the voltage can be easily varied by changing the positions of the connecting pattern, the leading pattern, and the terminating pattern. That is, the disc-type coils having various outputs can be fabricated by just changing the positions of the connecting pattern, the leading pattern, and the terminating pattern outside the conductor patterns, whereby a cost of the disc-type coils can be reduced by using the same components.

Additionally, in the coil apparatus according to the present invention, the disc-type coils are laminated through each insulating sheet and the lamination through holes of the plurality of disc-type coils, which are to be electrically connected, are connected through conductive pins that pierce the insulating sheet, coupling and electrical conduction of the disc-type coils that are to be laminated can be simultaneously achieved by just positioning the lamination through holes and inserting the pins, and hence the lamination work can be facilitated, thereby further reducing the manufacturing cost. Further, when the lamination through holes are connected through the pins, the disc-type coils can be positioned at the time of lamination, and a large current can be flowed through the disc-type coils, thus increasing a capacity of an output.

Furthermore, in the coil apparatus according to the present invention, when the lamination through holes forming a pair are arranged while displacing hole positions one by one in accordance with each disc-type coil and all the laminated disc-type coils are sequentially connected in series, the lamination work of positioning magnetic poles of the respective disc-type coils is completed by a simple operation, i.e., just inserting the pins while sequentially laminating the disc-type coils having the lamination through holes connected with a leading pattern and a terminating pattern of each disc-type coil to be laminated being displaced one by one, whereby the lamination work of the disc-type coils can be facilitated, and the manufacturing cost can be reduced.

Moreover, in the coil apparatus according to the present invention, when disc-type coils each having a plurality of coils connected in parallel are further connected to each other in parallel, a large current can be flowed by using the coils. On the other hand, when disc-type coils each having a plurality of coils connected in series are further connected each other in series, a voltage of a current flowed through the coils can be increased. Additionally, when the number of series connections in one disc-type coil is increased to assure a high voltage and the discs are connected in parallel to assure a large-current capacity, a high-voltage/high-capacity coil can be easily put to practical use. That is, when the number of discs or the coil connecting method is changed in the disc-type coils of one type having the same conductor pattern, a motor having a different capacity, e.g., a high-voltage motor or a low-voltage and large-current motor can be fabricated. Furthermore, any connection does not nullify the effect that the lamination work can be performed by just changing arrangement of the leading pattern and the terminating pattern drawn from the conductor pattern, i.e., positions of the lamination through holes without rotating each disc-type coil.

DESCRIPTION OF EMBODIMENTS

Figure 1:
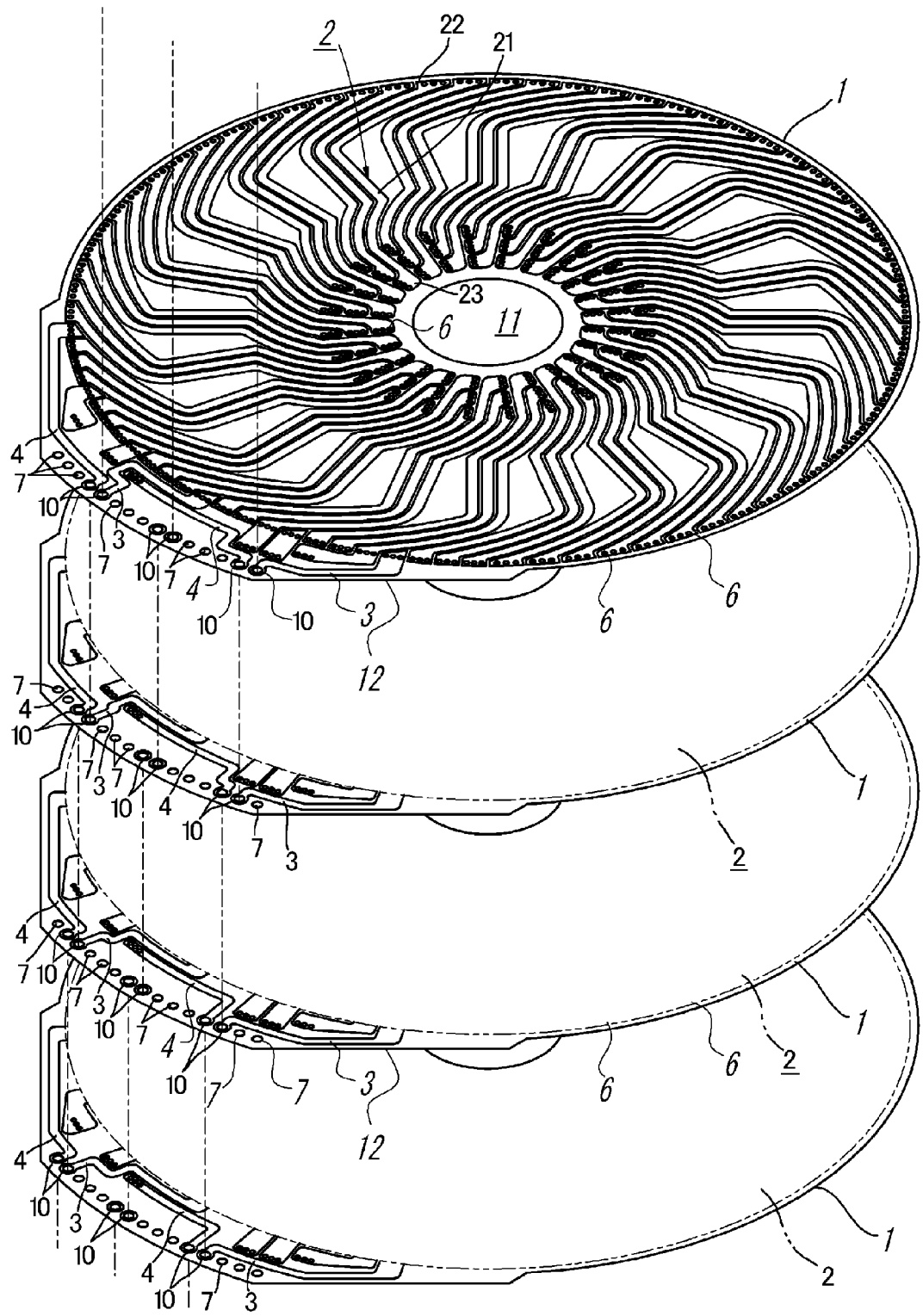
FIG. 1 is an exploded perspective view of a coil apparatus according to the present invention.

A configuration of a coil apparatus according to the present invention will now be described in detail based on an embodiment depicted in the drawings.

FIG. 1 to FIG. 14 show an embodiment that a coil apparatus according to the present invention is applied to a stator coil of a DC brushless motor. In this coil apparatus, four disc-type coils each having conductor patterns 2 for three circuits formed thereon are laminated, lamination through holes 10 of the disc-type coils adjacent to each other are electrically connected by using conductive pins 9 inserted in the lamination through holes 10 of the respective disc-type coils, whereby the plurality of laminated disc-type coils are connected in series to be used as one coil.

Figure 2:
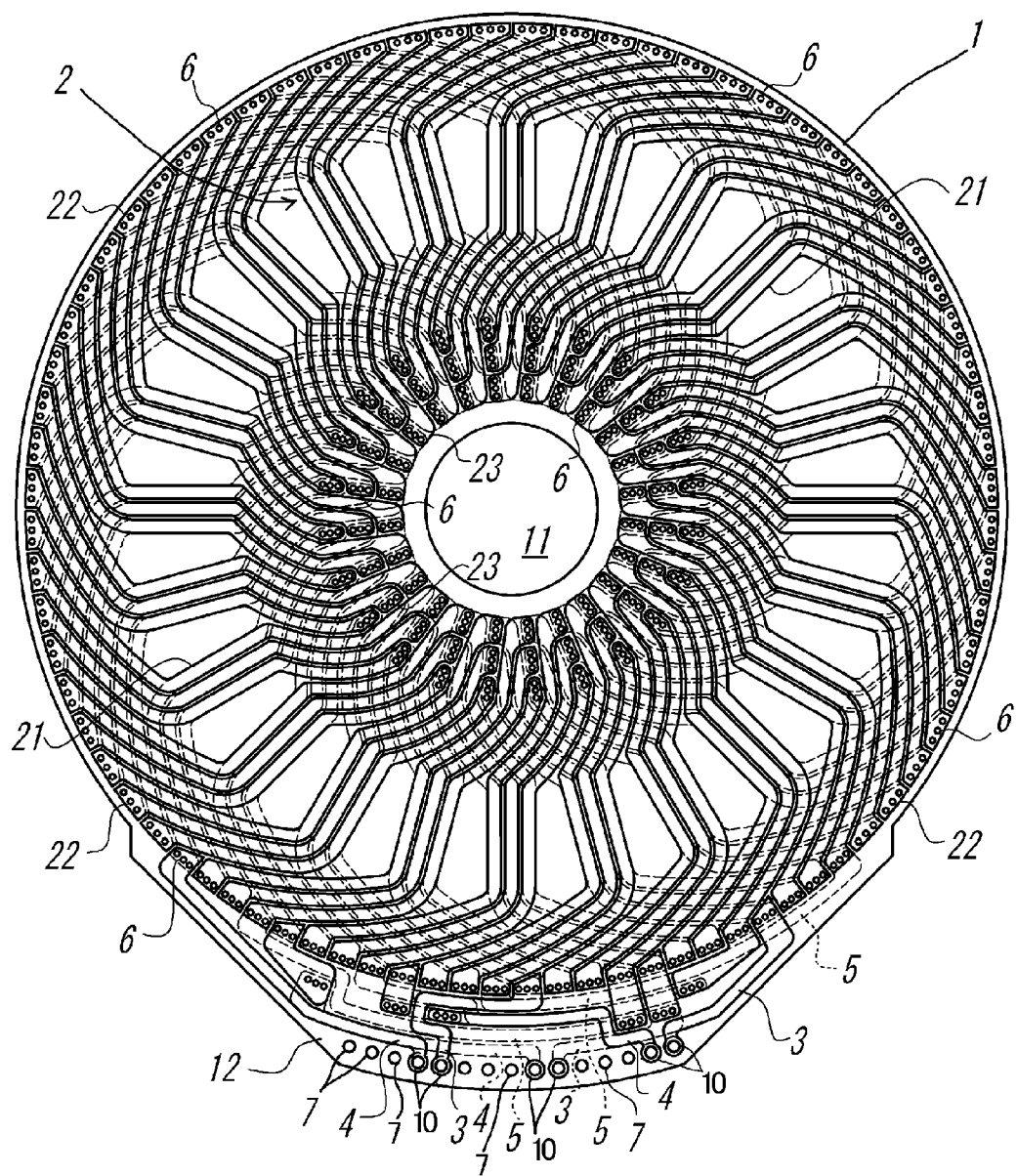
FIG. 2 is a front view of a disc-type coil in the uppermost layer of the coil apparatus depicted in FIG. 1.
Figure 3:
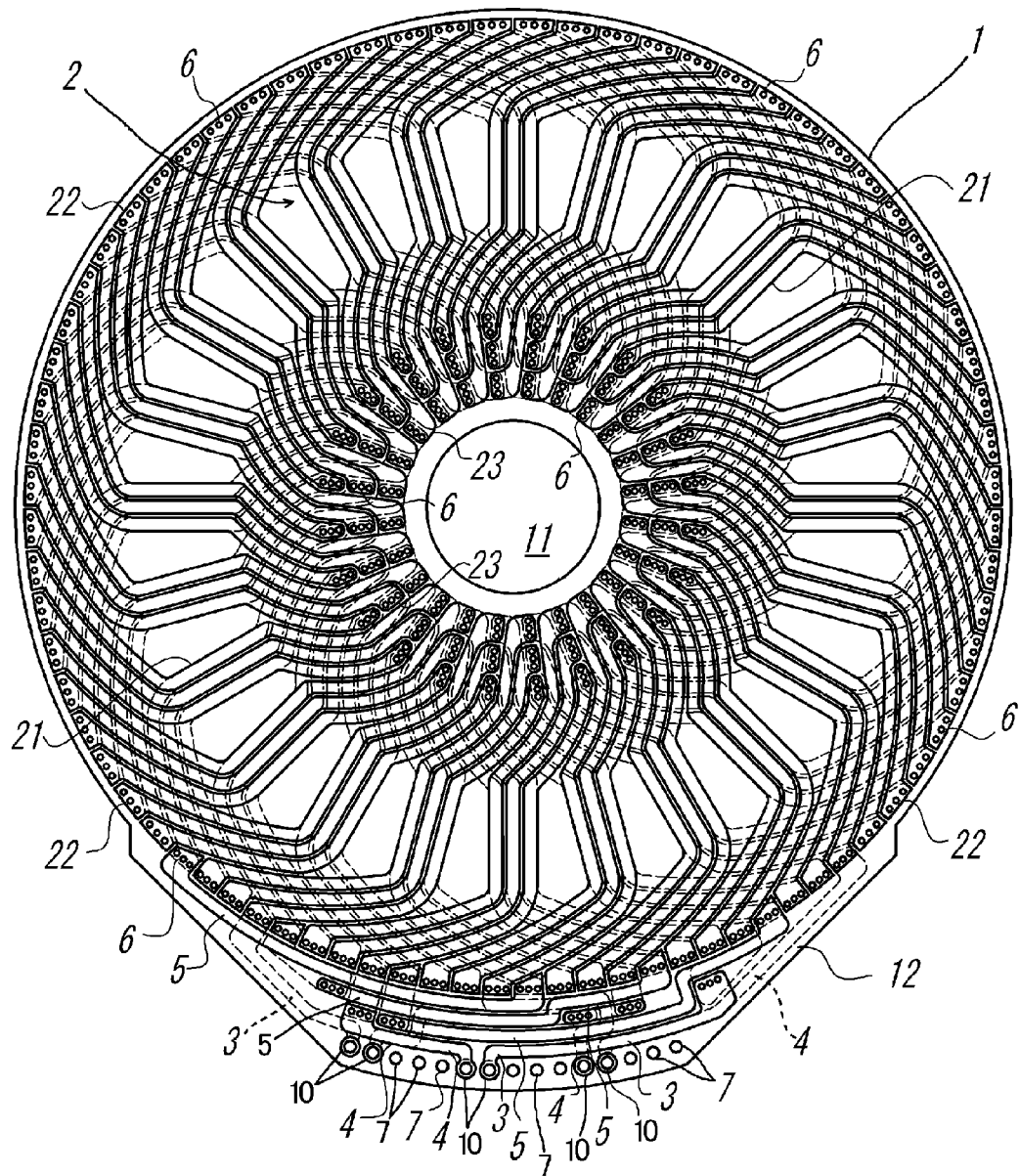
FIG. 3 is a back view of FIG. 2.

As shown in FIG. 2, each disc-type coil has an insulating substrate 1, conductor patterns 2, leading patterns 3, terminating patterns 4, connecting patterns 5, through holes 6 configured to connect the conductor patterns 2 on a front surface and a back surface of the insulating substrate 1 to each other, and the lamination through holes 10 configured to achieve electrical conduction with other disc-type coils, conductors 21 of the conductor patterns 2 formed on the front surface and the back surface of the insulating substrate 1 are electrically connected and folded back in a wave pattern at the through holes 6 provided in through hole lands 22 on the outer circumferential side and through hole lands 23 on the inner circumferential side to make a circuit in the circumferential direction of the insulating substrate, thereby forming a coil. As a result, respective units of the conductor patterns 2 in each disc-type coil are connected in series to assure a long wiring amount.

The insulating substrate 1 is constituted of a circular disc having an axial hole 11 formed at the center and made of an insulating synthetic resin material. A flange portion 12 on which the leading pattern 3, the terminating pattern 4, and the connecting pattern 5 are arranged is integrally formed in a part of an outer circumference of this insulating substrate 1 so as to protrude toward the outer side. A material of this insulating substrate 1 is not restricted in particular, and any one of a hard material and a flexible material can be selected.

Figure 5:
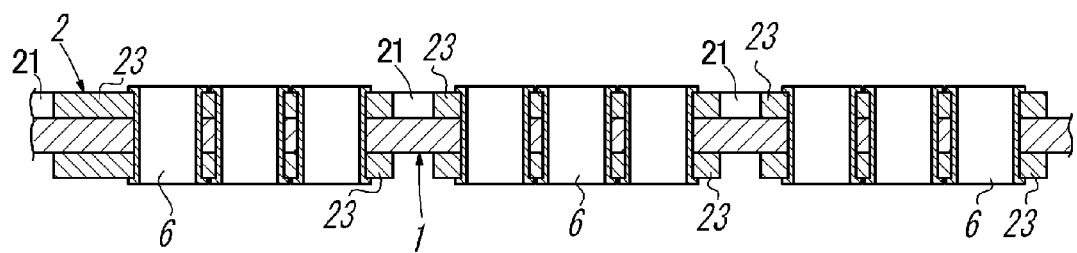
FIG. 5 is an enlarged longitudinal cross-sectional view of FIG. 4.

The conductor pattern 2 is formed by partially dissolving and corroding, e.g., a copper-based or aluminum-based foil attached to both surfaces of the insulating substrate 1 based on an etching technology (e.g., a print edge method) to be formed into a necessary pattern or by punching out a sheet-like metal material into a necessary pattern based on, e.g., a press technology and attaching this material to both the front and back surfaces of the insulating substrate 1. This conductor pattern 2 is formed by achieving through hole connections of the plurality of conductors 21 on the through hole lands 22 on the outer circumferential side and the through hole lands 23 on the inner circumferential side and thereby being folded back in a wave pattern alternately between the front surface and the back surface of the insulating substrate 1 to form one coil, the plurality of conductors 21 extending from the inner circumferential side toward the outer circumferential side or from the outer circumferential side toward the inner circumferential side between the through hole lands 22 and 23 annularly arranged along the inner circumferential side and the outer circumferential side of the annular insulating substrate 1. As shown in FIG. 5, the through holes 6 achieve electrical conduction of the conductor pattern 2 formed on the front surface of the insulating substrate 1 and the conductor pattern 2 formed on the back surface of the same on the respective through hole lands 22 and 23.

Figure 4:
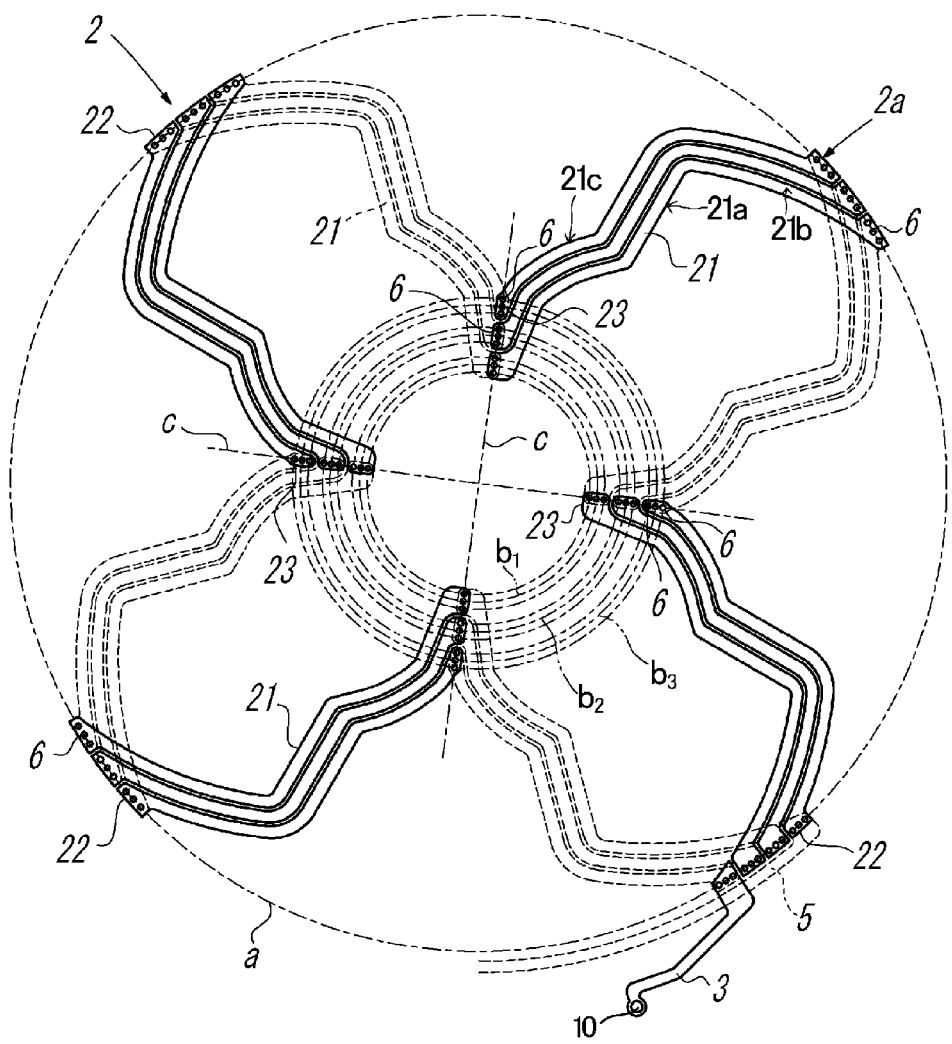
FIG. 4 is an extraction view of a primary part in FIG. 2.

Here, the through hole lands 22 on the outer circumferential side are annularly arranged on one circle a at fixed intervals, and the through hole lands 23 on the inner circumferential side are aligned and arranged on a plurality of concentric circles $b_1$, $b_2$, and $b_3$ and in a radial direction c of the insulating substrate 1. In this embodiment, as shown in FIG. 4, since the through hole lands 23 on the inner circumferential side of the plurality of conductors 21 constituting the same magnetic pole of the same circuit are aligned and arranged on the plurality of different concentric circles $b_1$, $b_2$, and $b_3$ and in the radial direction c of the insulating substrate 1, an area of each through hole land 23 on the inner circumferential side is equal to an area of each through hole land 22 on the outer circumferential side. Further, the plurality of through holes 6 are provided in each of the through hole lands 22 and 23 to expand a conduction area of the through hole connections in each of the through hole lands 22 and 23, whereby a value of a current flowing in the through hole connections is increased to reduce electrical resistance in the through hole connections in the overall through hole lands even though a through hole plating thickness is unchanged.

Figure 6:
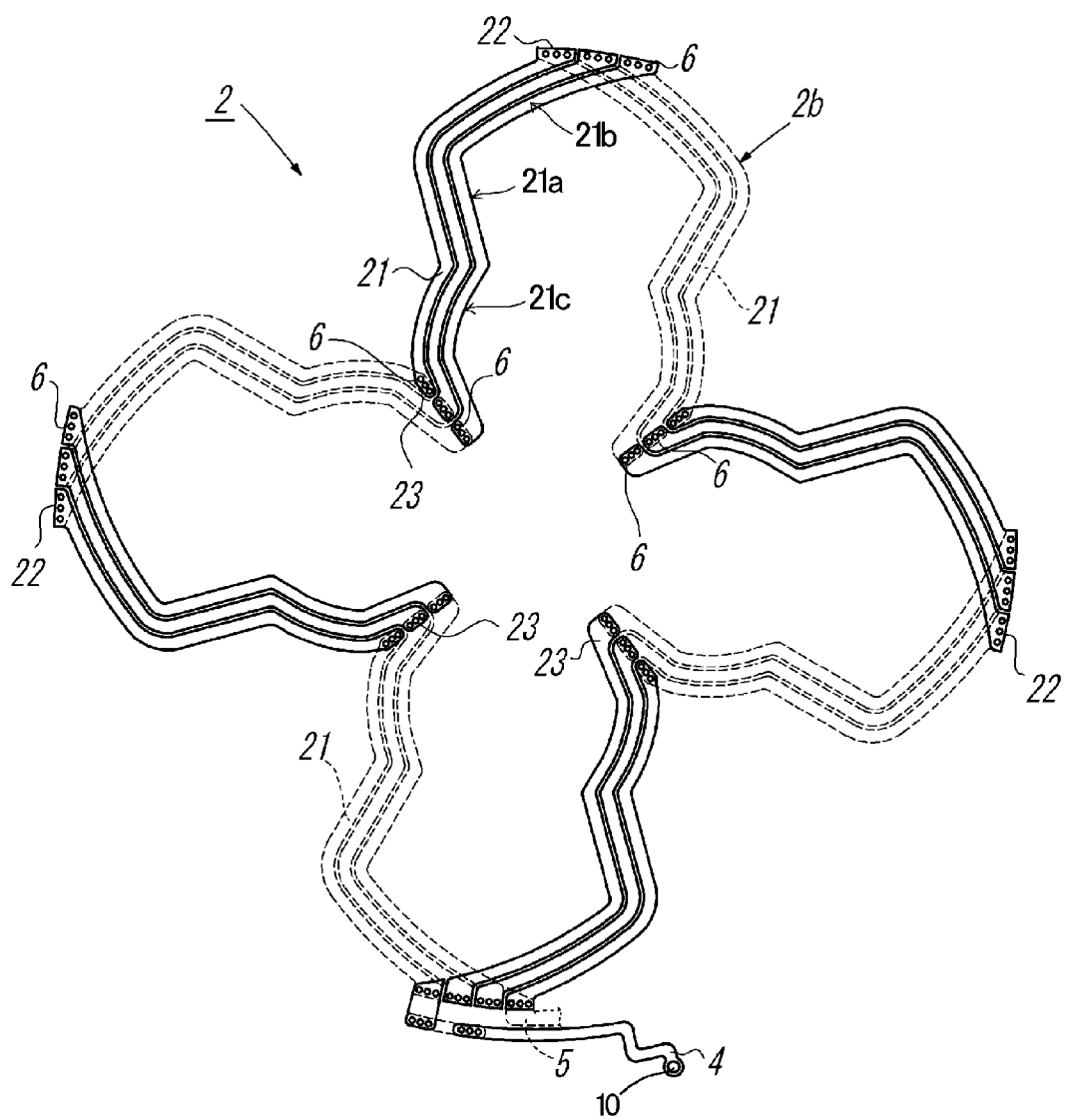
FIG. 6 is an extraction view of another primary part in FIG. 2.
Figure 7:
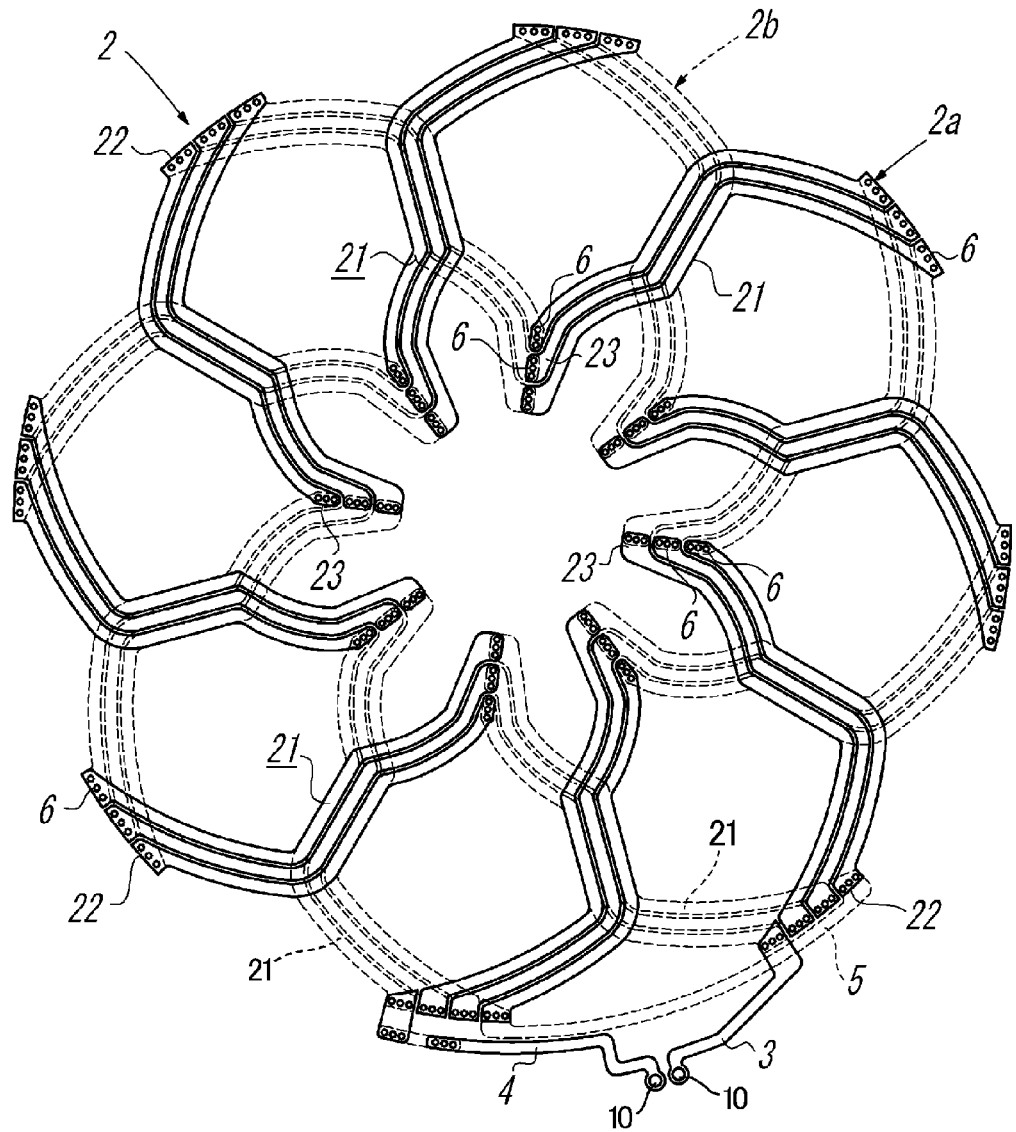
FIG. 7 is a combination view of FIG. 4 and FIG. 6.
Figure 8:
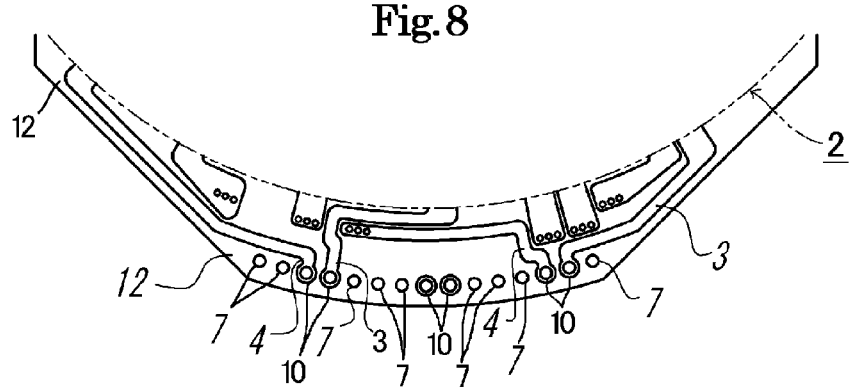
FIG. 8 is a front view of a primary part of a disc-type coil in a subsequent layer in FIG. 1.
Figure 9:
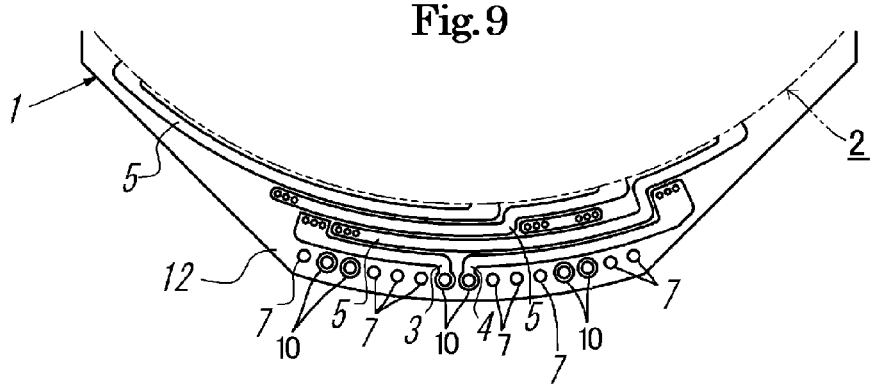
FIG. 9 is a back view of FIG. 8.
Figure 10:
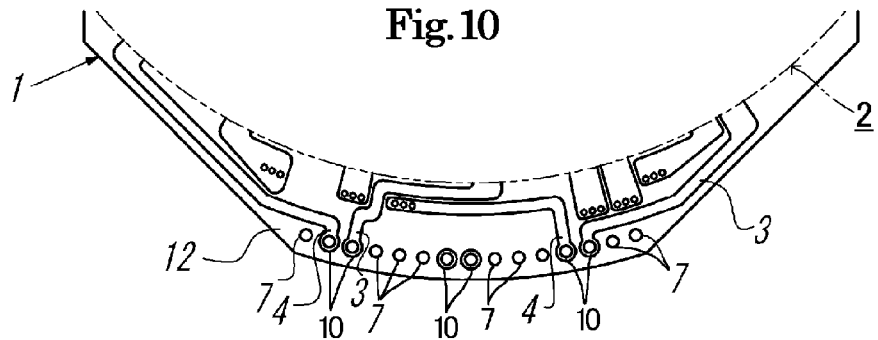
FIG. 10 is a front view of a primary part of a disc-type coil in a subsequent layer of FIG. 8.
Figure 11:
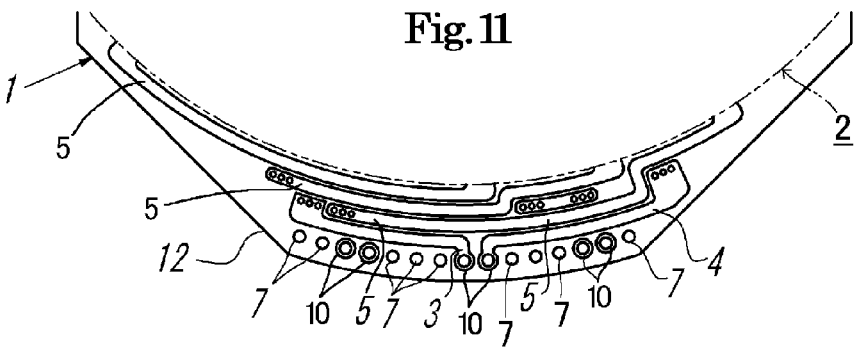
FIG. 11 is a back view of FIG. 10.
Figure 12:
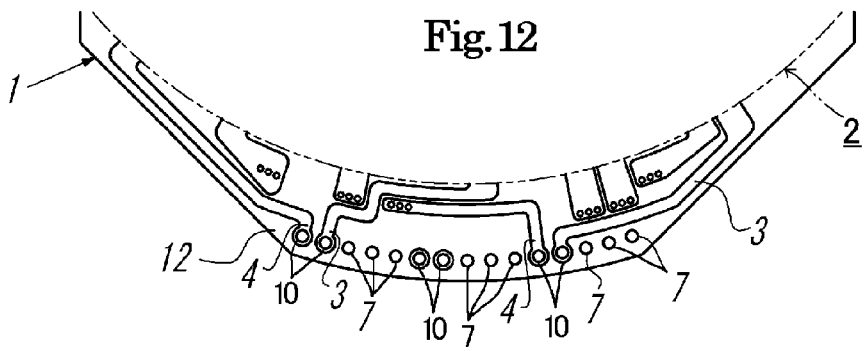
FIG. 12 is a front view of a primary part of a disc-type coil in a subsequent layer of FIG. 9.
Figure 13:
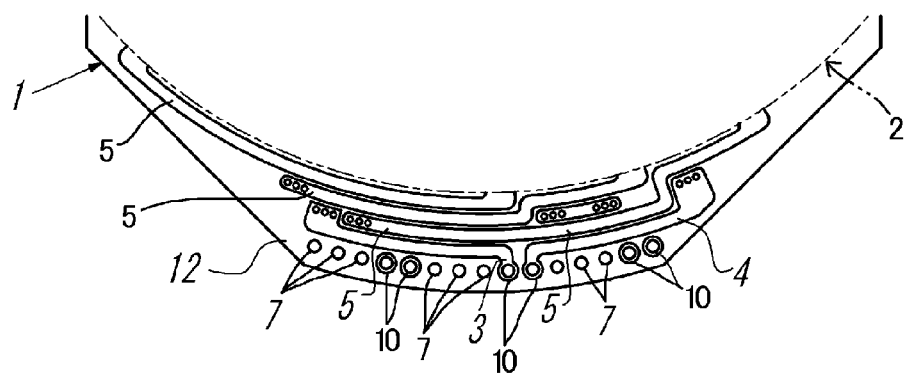
FIG. 13 is a back view of FIG. 12.

Furthermore, in regard to the conductor pattern 2, a coil half portion 2a depicted in FIG. 4 and a coil half portion 2b shown in FIG. 6 are laminated and connected via each connecting pattern 5 to form a coil shown in FIG. 7. Moreover, this coil is determined as one unit, and three units are laminated in phase to form a 3-phase 8-pole conductor pattern. At this time, when one coil half portion 2b is arranged to deviate from the other coil half portion 2a by a ½ pitch, grooves between lines of one coil half portion 2a are covered with lines of the other coil half portion 2b, thereby avoiding magnetic flux leakage.

Here, the conductor 21 is formed into a bent linear shape having a straight portion 21a provided at the annular center constituting a magnetic circuit and circular portions 21b and 21c drawing gentle arcs between the straight portion 21a and the through hole lands 22 and 23 at both ends. Additionally, widths and conductor intervals of the conductors 21 are uniformly set by equalizing centers of curvature of the respective circular portions 21b and 21c of the plurality of conductors 21 constituting the same pole of the same circuit on the same surface of the insulating substrate 1. As a result, narrow positions that restrict a value of a maximum current flowing through the conductor pattern 2 can be prevented from being formed in some of the conductors 21 while maintaining the conductor intervals constant.

Additionally, the leading pattern 3 is connected to the through hole land 22 on the outer circumferential side placed at a leading end of the one coil half portion 2a of the conductor pattern 2, and it is drawn to the flange portion 12 of the insulating substrate 1. The terminating pattern 4 is connected to the through hole land 22 on the outer circumferential side placed at a terminating end of the other coil half portion 2b of the conductor pattern 2, and it is drawn to the flange portion 12 of the insulating substrate 1. The connecting pattern 5 is connected to the through hole land 22 on the outer circumferential side placed at a terminating end of the one coil half portion 2a of the conductor pattern 2 and the through hole land 22 on the outer circumferential side placed at a leading end of the other coil half portion 2b of the conductor pattern 2, and it is drawn to the flange portion 12 of the insulating substrate 1. In this conductor pattern 2, since each leading pattern 3, each terminating pattern 4, and each connecting pattern 5 are concentrated on the flange portion 12 that protrudes from the outer circumference of the insulating substrate 1 and is provided at one position, coupling work when laminating the disc-type coils can be facilitated, and downsizing of each disc-type coil can be realized. Further, when each leading pattern 3, each terminating pattern 4, and each connecting pattern 5 are drawn to the outer side of the through hole lands 22 on the outer circumferential side of the conductor pattern 2, the high-density conductor patterns 2 can be easily and assuredly connected, realizing production at a low cost. It is preferable to disperse and arrange the leading patterns 3, the terminating patterns 4, and the connecting patterns 5 for three circuits on the front surface and the back surface of the insulating substrate 1 to avoid mutual interference of the patterns. For example, as shown in FIG. 8 to FIG. 13, the leading pattern 3 and the terminating pattern 4 connected to any holes of five lamination holes 7 in each of left and right groups are wired on the front surface of the flange portion 12 of the insulating substrate, and the leading pattern 3, the terminating pattern 4, and the connecting patterns 5 for three circuits connected to any ones of five lamination holes 5 in a central group are wired on the back surface of the flange portion 12 of the insulating substrate 1. It is to be noted that the leading patterns 3, the terminating patterns 4, and the connecting patterns 5 are integrally formed with the conductor patterns 2.

The leading pattern 3 and the terminating pattern 4 for each circuit of the conductor pattern 2 drawn to the flange portion 12 of the insulating substrate 1 of each disc-type coil are electrically connected to two lamination holes 7 selected in accordance with each disc-type coil to constitute the lamination through holes 10.

Figure 14:
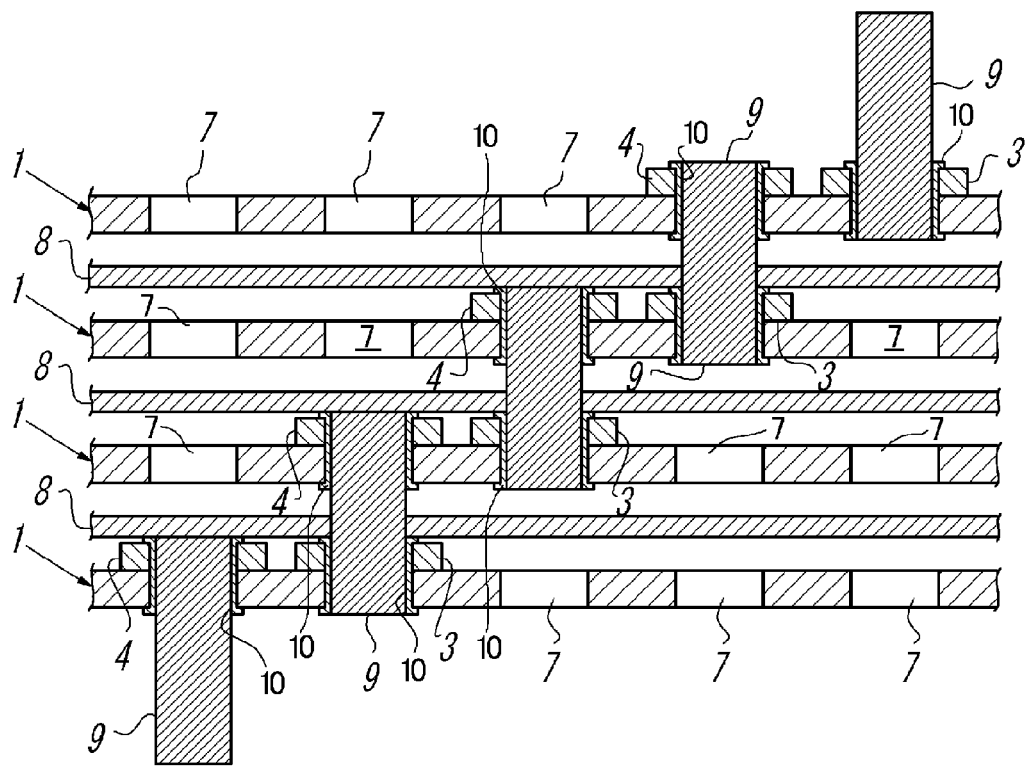
FIG. 14 is an enlarged cross-sectional view of a primary part showing a state that a plurality of disc-type coils are connected in series as one circuit in the coil apparatus in FIG. 1.
Figure 15:
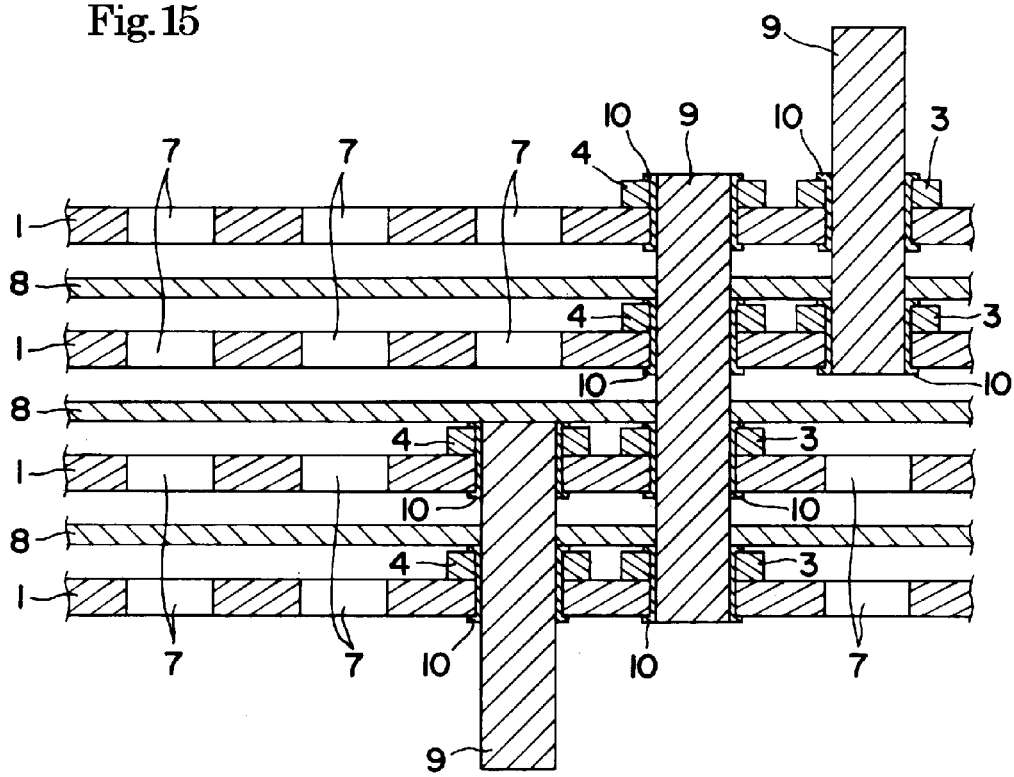
FIG. 15 is an enlarged cross-sectional view of a primary part showing an example that two pairs of parallel-connected disc-type coils are connected in series as one circuit in the coil apparatus in FIG. 1.
Figure 16:
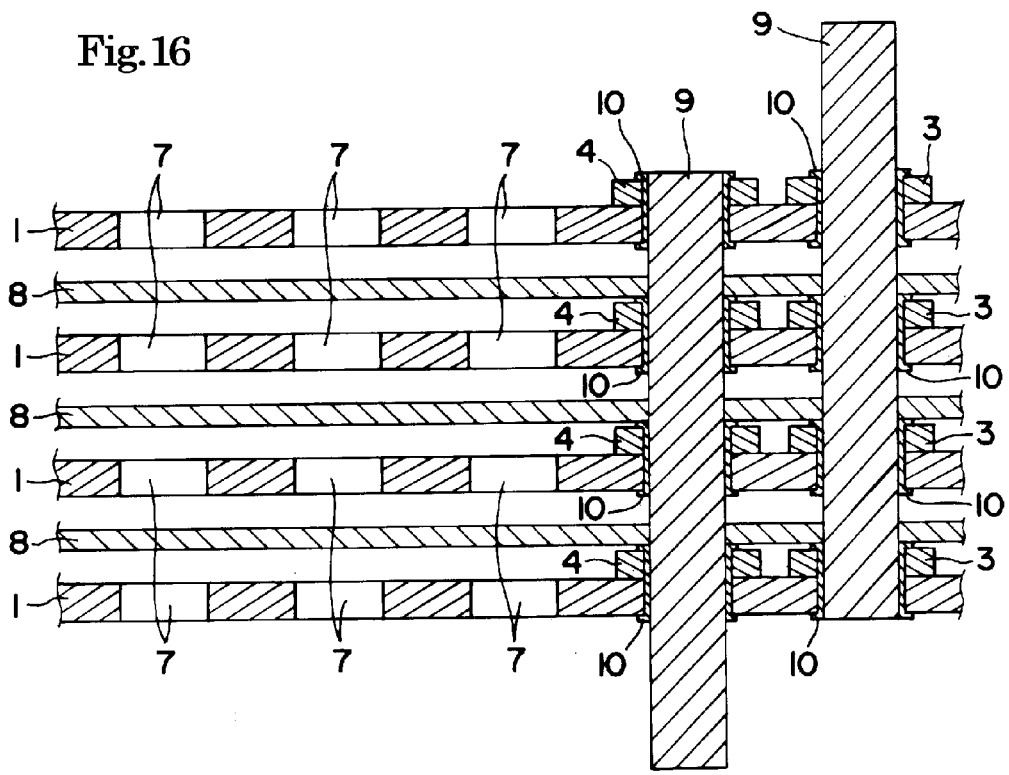
FIG. 16 is an enlarged cross-sectional view of a primary part showing a state that all disc-type coils are connected in parallel as one circuit in the coil apparatus in FIG. 1.
Figure 17:
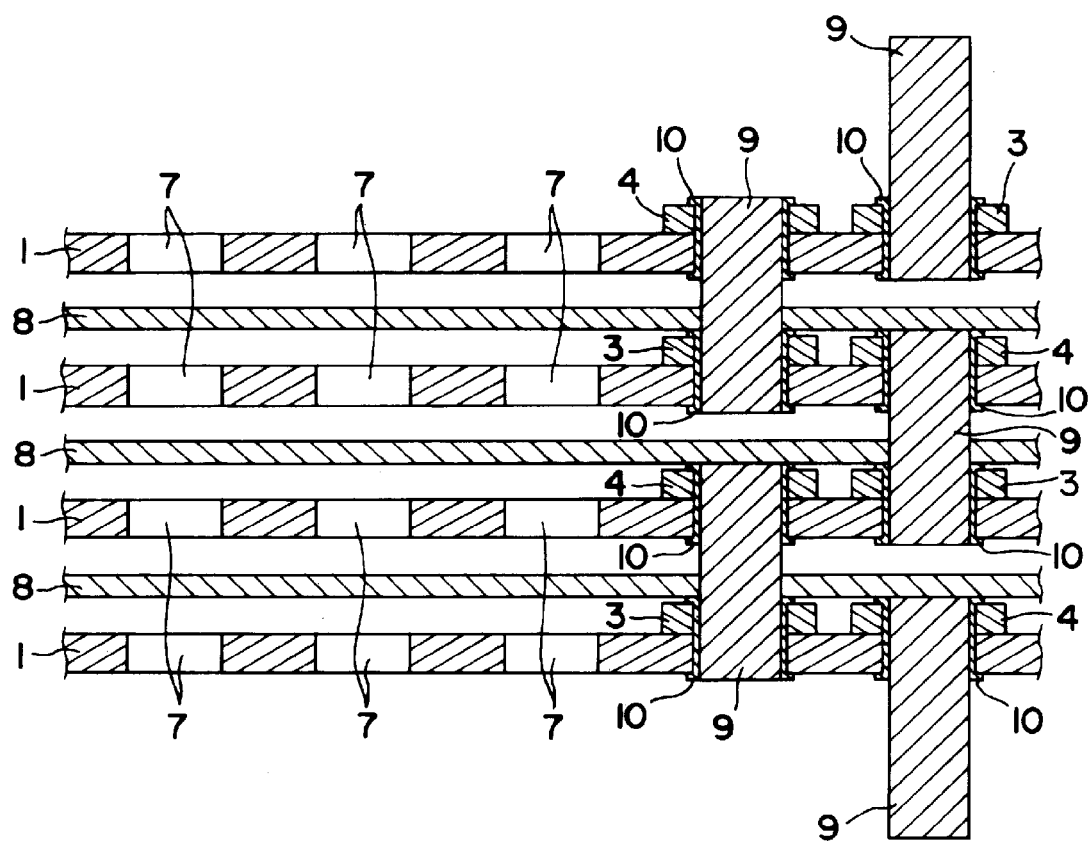
FIG. 17 is an enlarged cross-sectional view of a primary part showing another embodiment of connecting a plurality of disc-type coils in series as one circuit in the coil apparatus in FIG. 1.

As shown in FIG. 14, the lamination holes 7 connect the leading patters 3 and the terminating patterns 4 to each other between the plurality of disc-type coils bored in the insulating substrates 1 and laminated by, e.g., electroplating. In this embodiment that four disc-type coils each having conductor patterns 2 for three circuits are to be laminated, 15 holes, i.e., n+1 (n is the number of disc-type coils) holes are provided in proximity to each other in the flange portion 12 of the insulating substrate 1 per circuit of the conductor pattern 2. Here, it is necessary and sufficient to form the (n+1) lamination holes 7 at the same positions in a laminating direction in a state that the disc-type coils are laminated, there is no reason for necessarily forming these holes in proximity to each other, and it is satisfactory to align the positions of the lamination holes 7 in the laminating direction when the disc-type coils are laminated even if the holes are discretely present or with uneven pitches. It is needless to say that congregating the lamination holes 7 in proximity contributes to reduction in size of the coil apparatus, but the effect of facilitating the lamination work of the disc-type coils and reducing the manufacturing cost is not nullified even if the holes are not congregated in proximity. Furthermore, in regard to the number of the lamination holes 7, when at least the n+1 (n is the number of the disc-type coils) holes are provided per circuit, series connection exemplified in FIG. 14, such parallel connection as shown in FIG. 15 or FIG. 16, or any other series connection depicted in FIG. 17 can be achieved, and hence a degree of freedom of connecting the plurality of disc-type coils to be laminated can be further increased. However, the number of the lamination holes 7 is not necessarily restricted to n+1 (n is the number of the disc-type coils) per circuit, and the plurality of disc-type coils can be connected in series or connected in parallel by changing how to connect the pins 9 or the arrangement of the leading patterns 3 and the terminating patterns 4 as long as at least two holes are provided per circuit as shown in FIG. 15 to FIG. 17, thereby fabricating different induction devices.

Here, in this embodiment that at least the n+1 lamination holes 7 are provided per circuit in each disc-type coil, the series connection, the parallel connection, or connection having both the parallel connection and the series connection can be freely selected by just changing positions of the lamination holes connected to the leading patterns and the terminating patterns, i.e., positions of the lamination through holes by using the disc-type coils having the same conductor patterns and the holes configured to form the lamination through holes provided at the same positions. That is, in the respective disc-type coils according to this embodiment, although arrangement of conductor patterns 2, the connecting patterns 5, and the lamination holes 7 are the same, but arrangement of the leading patterns 3 and the terminating patterns 4 differs depending on each disc-type coil, and the lamination through holes 10 are arranged to be sequentially displaced one by one in the disc-type coils adjacent to each other as shown in FIG. 14. That is, a position of the through hole land 22 to which the leading pattern 3 and the terminating pattern 4 are drawn and a position of the through hole land 22 connected to the connecting pattern 5 are equal in all the disc-type coils, and positions of the lamination holes 7 connected with the leading patterns 3 and the terminating patterns 4, i.e., positions of the lamination through holes 10 alone differ depending on each disc-type coil in accordance with how to connect the disc-type coils to be laminated.

As shown in FIG. 14, the thus configured four disc-type coils are laminated through insulating sheets 8. In this lamination, the insulating substrates 1 do not have to be rotated to position magnetic poles of the respective disc-type coils, and these coils can be laminated as they are. It is to be noted that connection of the lamination through holes 10 is completed by just laminating the disc-type coils through the insulating sheets 8 and then sequentially laminating the insulating sheets 8 and the disc-type coils while inserting the conductive pins 9 through the insulating sheets 8. A hole for insertion of the pin 9 is previously formed in each insulating sheet 8. It is to be noted that the pin 9 that is longer than a neighboring lamination thickness of the laminated disc-type coil may be used to be inserted into another lamination through hole 7 which does not constitute the lamination hole 10. That is, the pin 9 may have a length far longer than a thickness of the plurality of disc-type coils to be electrically connected or a length for piercing the insulating substrates of all the disc-type coils, for example. Even if such a configuration is adopted, since the lamination holes 7 other than the lamination through holes 10 do no have through hole plating and lands or they are not connected to the leading patterns 3 or the terminating patterns 4, electrical conduction is not achieved with the conductor patterns 2 of other disc-type coils which do not have to be electrically connected, and all the disc-type coils are just mechanically coupled with each other. In this case, just inserting the pins 9 into the lamination holes 7 with all the disc-type coils being laminated can suffice, and hence the lamination work of the disc-type coils can be greatly facilitated, and the manufacturing cost can be reduced. As a matter of course, as shown in FIG. 14, in a configuration where every two disc-type coils are laminated while achieving connection in the lamination holes 10 by using the pins 9, the work can be easily performed, thereby further reducing the manufacturing cost.

Further, the connection of the plurality of laminated disc-type coils is not restricted to the series connection system for displacing the lamination holes 7 which function as the lamination through holes 10 one by one as shown in FIG. 14, and various connection systems can be adopted as required. For example, as shown in FIG. 15, the plurality of disc-type coils to be laminated are divided into a plurality of sets, the lamination through hole 10 connected with the leading pattern 3 of each disc-type coil in each set and the lamination through hole 10 connected with the terminating pattern 4 of the same are arranged at the same position in the laminating direction and connected in parallel through the pin 9 and, on the other hand, the lamination through hole 10 connected with the terminating pattern 4 of each parallel-connected disc-type coils in each set and the lamination through hole 10 connected with the leading pattern 3 of each disc-type coil in another set are arranged at the same position in the laminating direction, and the sets of the parallel-connected disc-type coils may be connected in series by using one common pin 9.

Alternatively, as shown in FIG. 16, the lamination through holes 10 connected with the leading patterns 3 of all the laminated disc-type coils and the lamination through holes 10 connected with the terminating pattern 4 of the same are arranged at the same positions in the laminating direction, and the leading patterns 3 are connected to each other through one common pin 9 piercing the lamination through holes 10 at the same position whilst the terminating patterns 4 are connected to each other through one common pin 9 piercing the lamination through holes 10 at the same position, whereby all the laminated disc-type coils can be connected in parallel.

Further, as shown in FIG. 17, the lamination through hole 10 connected with the terminating pattern 4 of one of the disc-type coils adjacent to each other and the lamination through hole 10 connected with the leading pattern 3 of the other of the same are arranged at the same position in the laminating direction, and the lamination through holes 10 are arranged in such a manner that the leading patterns 3 and the terminating patterns 4 are alternately arranged in the disc-type coils adjacent to each other in the laminating direction, whereby the lamination through holes 10 in two rows can be connected in series through the pins 9 that are arranged in a staggered pattern. In this case, it is preferable for the leading patterns 3 and the terminating patterns 4 of the coils for one circuit to be arranged on the front surface and the back surface of the insulating substrate 1 in the dispersed pattern to prevent the leading patterns 3 and the terminating patterns 4 from crossing each other.

Figure 18:
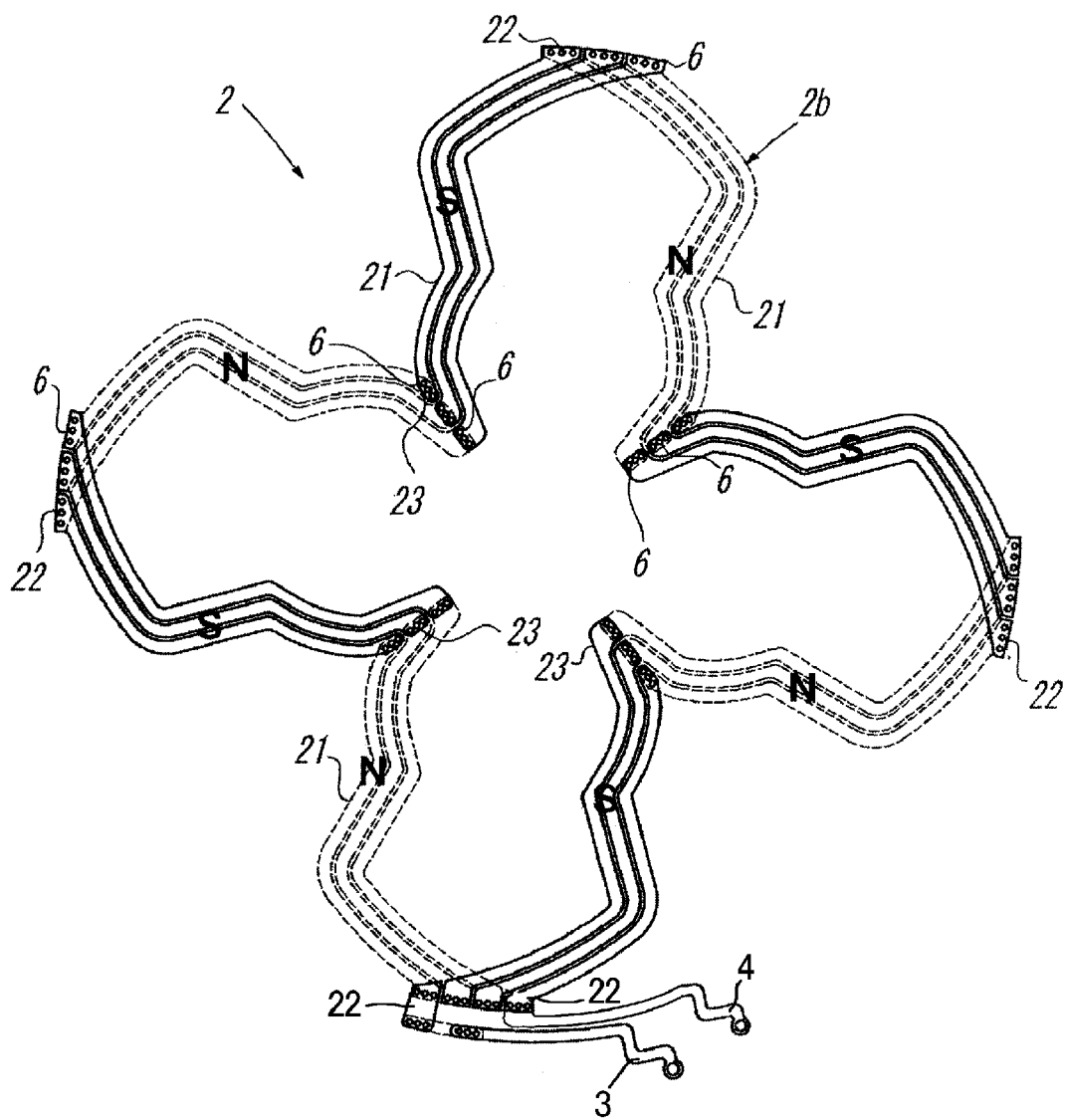
FIG. 18 is a front view of a disc-type coil showing an example that a coil of one circuit is constituted of a coil (a coil half portion 2*b*)
Figure 19:
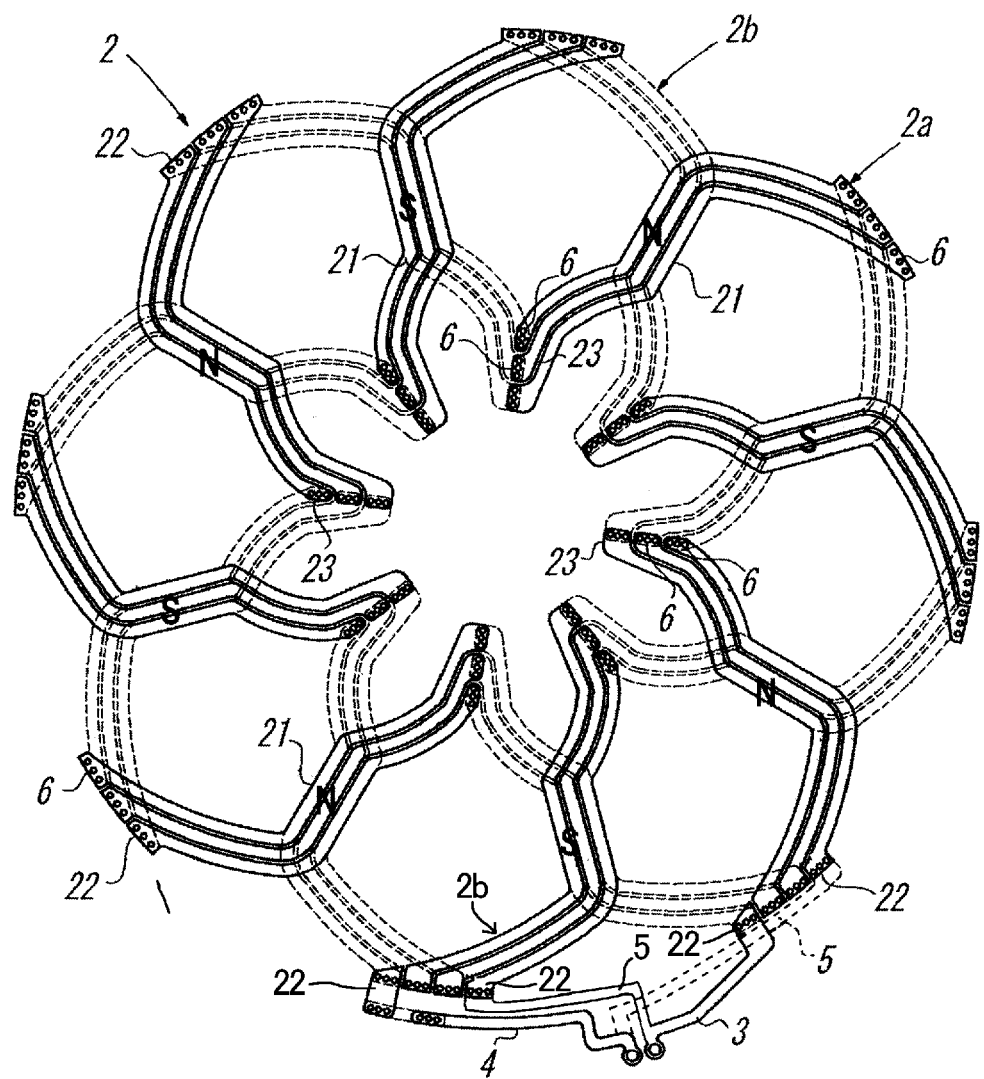
FIG. 19 is a front view of a disc-type coil showing an example that two coils (coil half portions 2a and 2b) are connected in parallel in one disc.

Furthermore, the present invention is not restricted to the conductor pattern 2 according to the embodiment shown in FIG. 1 to FIG. 14 in particular, and respective circuits of the conductor patterns 2 in each disc-type coil can be arbitrarily connected in parallel or series depending on configurations of the leading patterns 3, the terminating patterns 4, and the connection patterns 5. That is, in one disc-type coil in which a plurality of coils including at least one coil connected with the leading pattern 3 and one coil connected with the terminating pattern 4 are formed, the plurality of coils can be connected in series or connected in parallel by changing a wiring line of the connection pattern 5. For example, as shown in FIG. 19, the leading pattern 3 connected to the coil half portion 2a is connected with the land 22 which serves as a leading end of the coil half portion 2b through the connecting pattern 5 and, on the other hand, the terminating pattern 4 connected with the coil half portion 2b is connected to the land 22 which serves as a terminating end of the coil half portion 2a through the connecting pattern 5, whereby the two coil half portions 2a and 2b can be connected in parallel. In this case, a value of a current that can be flowed can be increased by achieving the parallel connection. Furthermore, as shown in FIG. 7, a voltage can be increased by achieving the series connection. It is needless to say that, in the embodiment of such series connection as depicted in FIG. 7 or such parallel connection as shown in FIG. 19, the present invention is mainly described with reference to the example where the coil half portion 2a and the coil half portion 2b that deviate from each other with a ½ pitch are connected through the connecting pattern 5 in one disc, but three or more coils can be connected in series or in parallel through the connecting patterns 5 in one disc. Such a case is effective when applied to an induction device having a high output in particular, and a preferred result was obtained in regard to an induction device of 3 KW or above according to a result of test production conducted by the present inventor, for example. Moreover, as shown in FIG. 18, one coil can be configured by connecting the land 22 serving as a leading end of the coil half portion 2b and the land 22 serving as a terminating end of the same to the leading pattern 3 and the terminating pattern 4, respectively.

As described above, a plurality of disc-type coils each having a plurality of coils connected in parallel or connected in series can be further connected in series or connected in parallel. When achieving the parallel connection of a plurality of disc-type coils each having a plurality of coils connected in parallel, a large current can be flowed by the coils. On the other hand, when achieving the series connection of a plurality of disc-type coils each having a plurality of coils connected in series, a voltage of a current flowed through the coils can be increased. Moreover, when the number of series connections is increased in one disc-type coil to assure a high voltage and the discs are connected in parallel to assure a large current, a capacity of 5 KW or above, which cannot be realized by the conventional technology, can be put to practical use. However, in any connection, since the lamination through holes 10 are arranged at a position to which the conductor pin 9 is inserted, the effect of enabling the circuit connection without rotation of the disc-type coils is not nullified.

Figure 20:
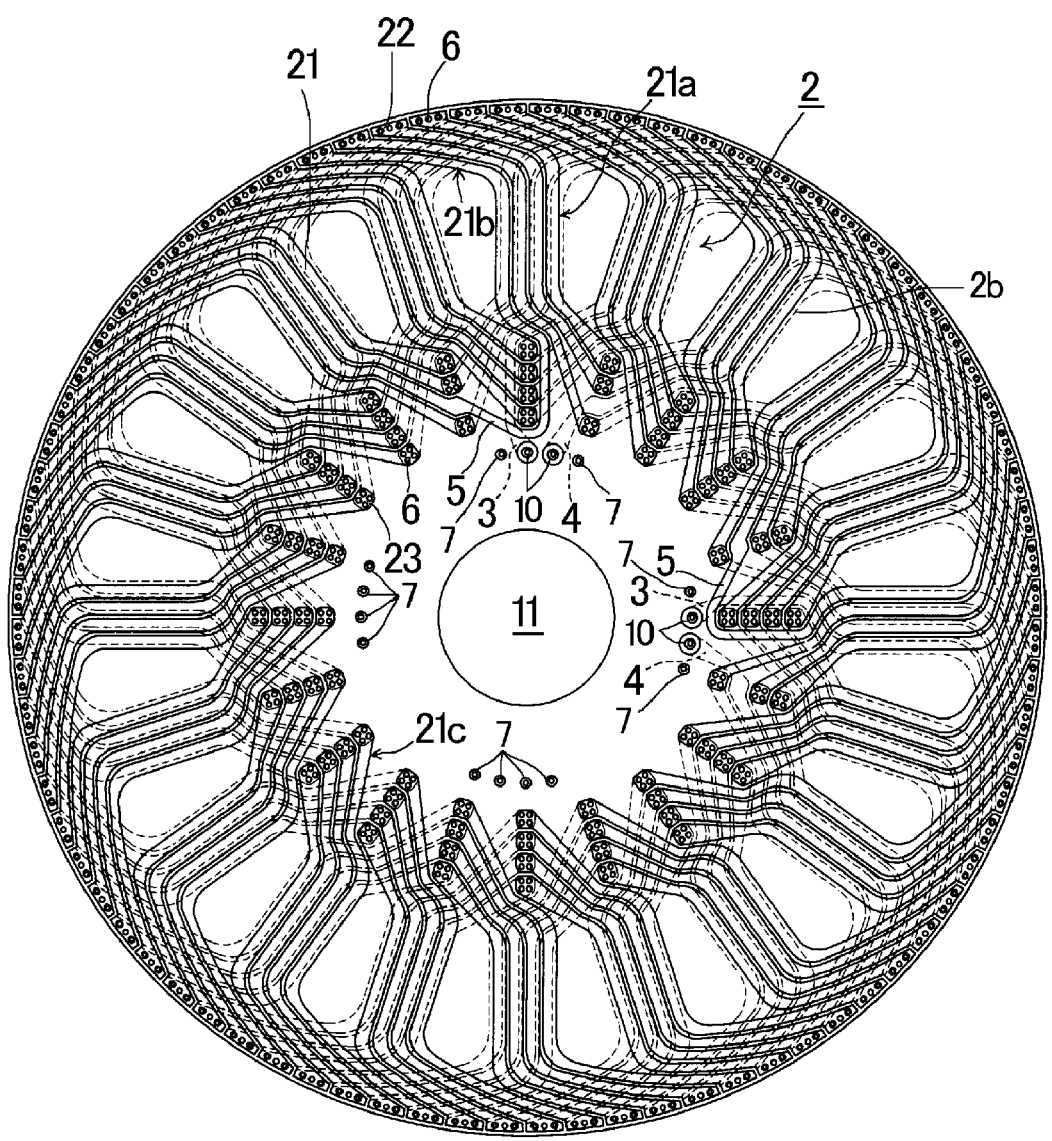
FIG. 20 is a front view showing an example of a 2-circuit 10-pole conductor pattern for a DC brushless motor in which lamination through holes and holes configured to form the lamination through holes are arranged in a space on the inner circumferential side of the disc-type coil.
Figure 21:
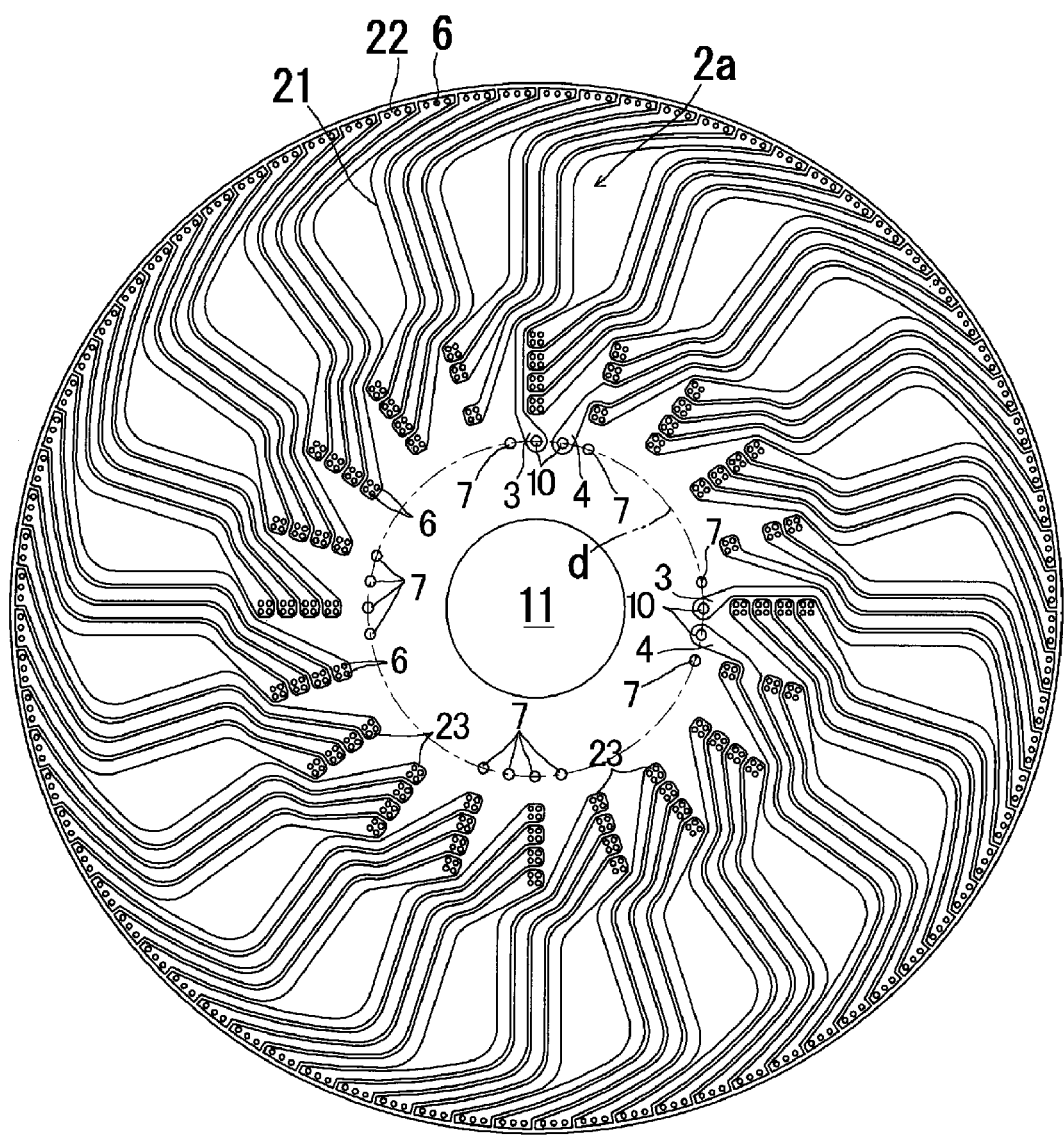
FIG. 21 is an explanatory view showing a conductor pattern on a back surface side alone of the disc-type coil depicted in FIG. 20.

Additionally, the leading pattern 3 and the terminating pattern 4 can be drawn to the inner circumferential side of the insulating substrate 1 or, these patterns can be drawn to an inner space of the through hole lands 23 on the inner circumferential side and connected to the lamination through holes 10. For example, FIG. 20 and FIG. 21 shows an embodiment when laminating three disc-type coils each of which is of an inwardly drawn type and has conductor patterns 2 for two circuits formed thereon. In each disc-type coil according to this embodiment, groups each including four (n+1) lamination holes 7 are formed at intervals of 90° on a circumference d on the inner side of through hole lands 23 on the inner circumferential side. Further, a leading pattern 3 and a terminating pattern 4 are connected to two of the four lamination holes 7 in arbitrary groups. On the other hand, connecting patterns 5 are drawn and wired in the conductor pattern 2 in order to connect a terminating end of a coil half portion 2a to a leading end of a coil half portion 2b (which is wired so as to deviate from the coil half portion 2a at 36°. In this embodiment, as shown in FIG. 20, since the terminating end of the coil half portion 2a and the leading end of the coil half portion 2b serve as through hole lands 22 on the outer circumferential side, the connecting patterns 5 are wired toward the through hole lands 23 on the inner circumferential side along other conductors 21 and also wired toward the through hole lands 22 on the outer circumferential side while drawn to avoid the inner side of the through hole lands 23 on the inner circumferential side in order to connect the leading end to the terminating end. At this time, the connecting patterns 5 are formed on a surface on the opposite side of a surface where the leading patterns 3 and the terminating patterns 4 are formed so as not to cross the leading patterns 3 and the terminating patterns 4. In this embodiment, when the surface where the leading patterns 3 and the terminating patterns 4 are formed is a front surface, the connecting patterns 5 are formed on the back surface side. As described above, in the embodiment having the configuration that the leading patterns 3, the terminating patterns 4, and the connecting patterns 5 are drawn to the inner circumferential side of the insulating substrate 1, a coil radius is increased when an output is raised, and hence the space can be easily assured on the inside-diameter side, resulting in an effective application. It is to be noted that the lamination holes for four circuits are dispersed and arranged at intervals of 90° in the drawing, the lamination holes 7 can be aggregated at one position in proximity.

As described above, in the disc-type coil having the configuration that the space produced on the inner circumferential side of the insulating substrate 1 is utilized to draw the leading patterns 3 and the terminating patterns 4 to the inner circumferential side of the insulating substrate 1 and to form the lamination through holes 10, there can be obtained an advantage that a large space is not required since the flange portion 12 does not protrude to the outside of the insulating substrate 1. Furthermore, when an output is raised, since the space produced on the inner circumferential side is further increased with enlargement of a coil radius, this space can be effectively utilized, which is effective for downsizing.

Moreover, in this embodiment, although the lamination holes 7 provided in the insulating substrate 1 do not have through hole plating and lands, the through hole plating and the lands may be previously formed with respect to all the lamination holes 7 in some cases, and the leading patterns 3 and the terminating patterns 4 may be connected to the lands of the selected lamination holes 7.

It is to be noted that the foregoing embodiments are preferred embodiments according to the present invention, but the present invention is not restricted thereto, and they can be modified in many ways without departing from the gist of the present invention. For example, although the conductor pattern 2 in each of the embodiments shown in FIG. 1 to FIG. 21 is a preferred conformation, the present invention is not restricted thereto in particular. Such a conductor pattern 2 is not restricted in particular, and the invention can be applied to various conductor patterns such a spiral conductor pattern as disclosed in, e.g., Japanese Patent Publication No. 3636700 or can be applied to another conductor pattern such as shown in FIG. 22 and FIG. 23.

Figure 22:
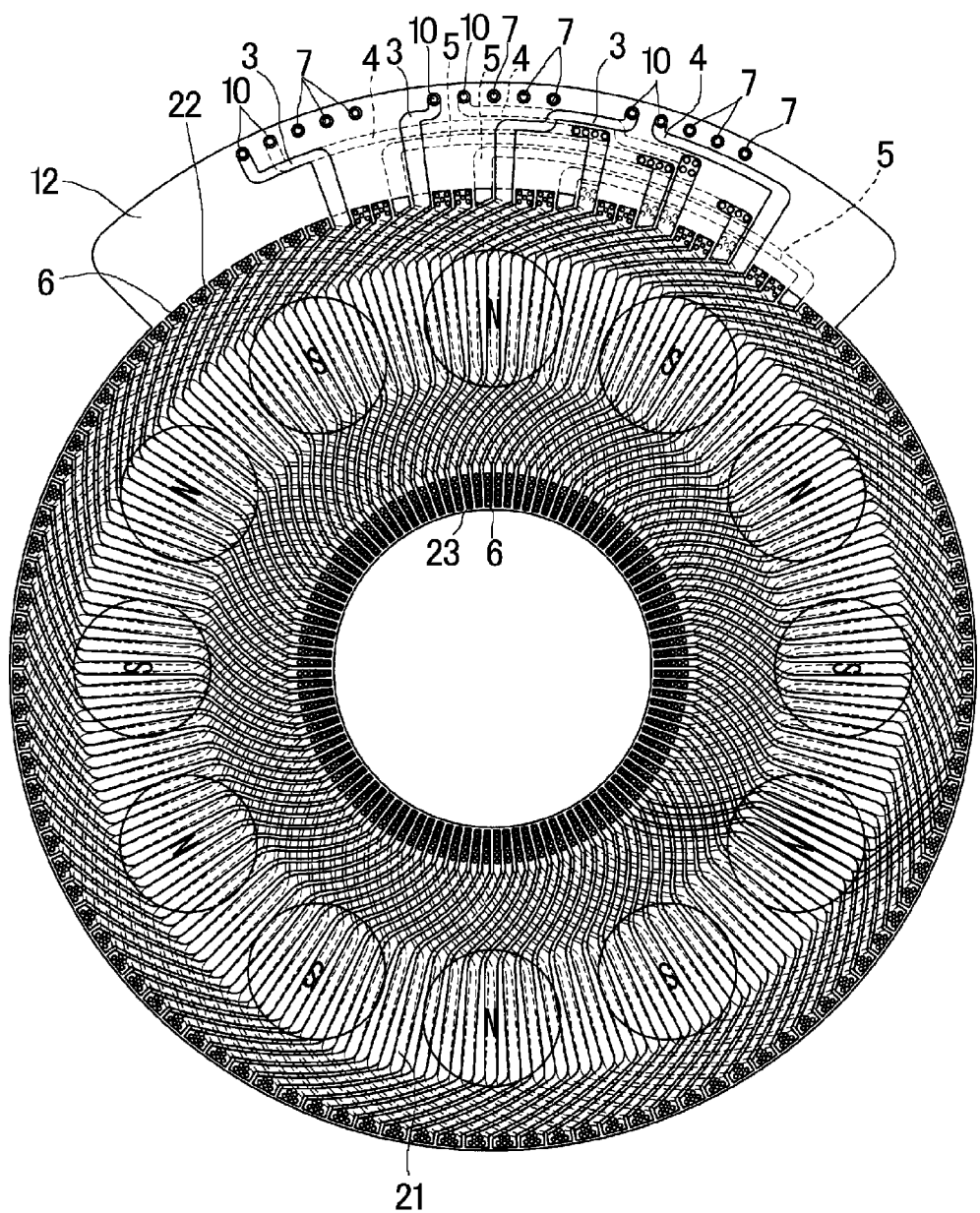
FIG. 22 is a front view showing another embodiment of through hole lands on the inner circumferential side of the disc-type coil as an example of an outwardly-drawn-type 3-pole 12-pole conductor pattern for a DC brushless motor.
Figure 23:
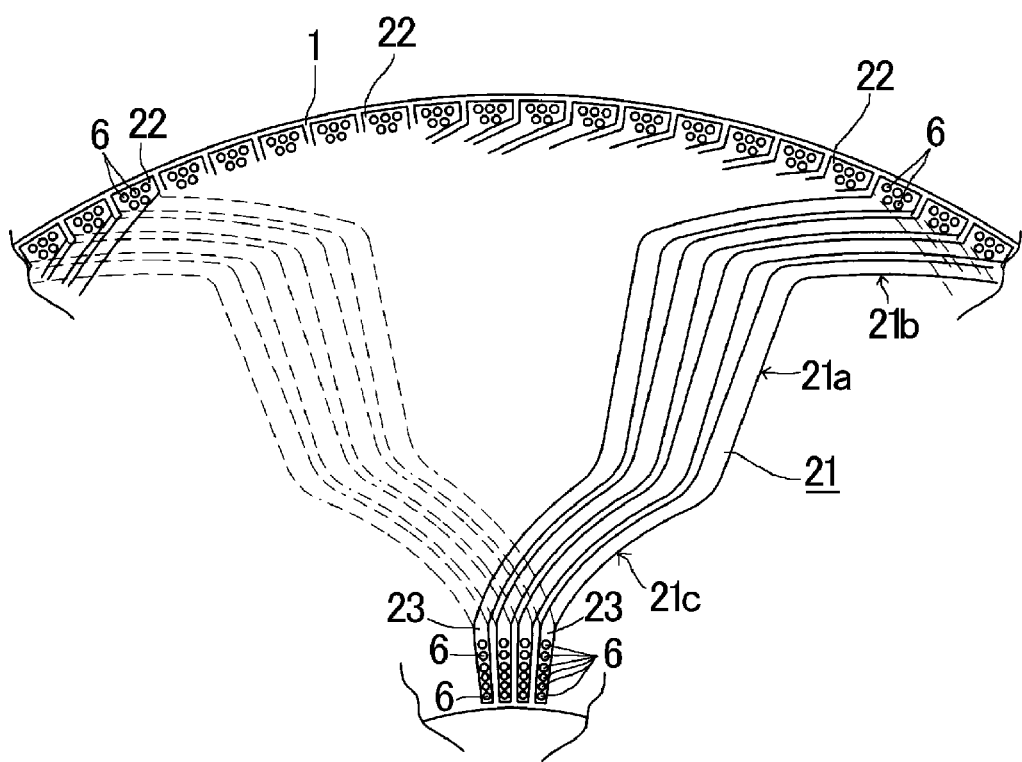
FIG. 23 is an enlarged partial explanatory view showing a conductor pattern depicted in FIG. 22.

In a disc-type coil shown in FIG. 22 and FIG. 23, a plurality of through holes 6 are formed in each through hole land 23 on the inner circumferential side and aligned in a radial direction c of an insulating substrate 1, and an electrical conduction area of each through hole connection in one through hole land 23 on the inner circumferential side is expanded without extending each through hole land 23 on the inner circumferential side along the circumferential direction, whereby a value of a current flowing in the through hole connections in the overall through hole lands 23 on the inner circumferential side can be increased even though a through hole plating thickness is unchanged. Specifically, as shown in FIG. 23, the through hole land 23 on the inner circumferential side according to this embodiment has an area expanded in the radial direction c of the insulating substrate 1, an extended line of an outline thereof in the radial direction has a wedge shape that coincides with the center of the insulating substrate 1, and wiring is installed in such a manner that the conductor 21 is drawn from an end portion of this land on the outer side in the radial direction. That is, the area of the through hole land 23 on the inner circumferential land is expanded in the radial direction of the insulating substrate so that a sufficient width for the through hole land can be assured insofar as a fixed conductor interval can be formed and a width in the circumferential direction can be tolerated to the utmost limit, and it is formed into a vertically long inverted trapezoid shape that can be fitted in a region between regions serving as two conductor intervals partitioned by lines radially running from the center of the insulating substrate 1 along the radial direction c so that the fixed conductor intervals can be obtained. That is, the through hole land 23 on the inner circumferential side is formed into a substantial wedge shape that its width is gradually narrowed toward the inner circumferential side of the insulating substrate. Although the through hole lands 23 on the inner circumferential side according to this embodiment are annularly arranged in the circumferential direction along the inner circumference of the insulating substrate 1, they are expanded in the radial direction c of the insulating substrate 1, thereby forming the plurality of through holes. For example, in this embodiment, when the six through holes 6 are formed, a requisite amount of plating for the through hole connections and the like is assured so that a value of a current flowing through the entire conductor patterns is not restricted by a value of a current flowing in the through holes. Further, since the wiring is installed in such a manner that the conductors 21 are drawn from outer ends of the through hole lands 23 on the inner circumferential side in the radial direction, a width of each conductor 21 near each through hole land 23 on the inner circumferential side is equal to that of the through hole land 23 on the inner circumferential side, whereby the value of the current flowing through the entire conductor patterns is not restricted by the conductor width.

In this embodiment, to laminate four disc-type coils each having the conductor patterns 2 for three circuits formed thereto, 15 holes are provided, namely, n+1 (n is the number of the disc-type coils) holes are provided to aggregate in proximity to each other per circuit in the conductor patterns 2 in the flange portion 12 of the insulating substrate 1. Furthermore, the leading pattern 3 and the terminating pattern 4 for each circuit in the conductor patterns 2 in each disc-type coil are electrically connected to two holes 7 selected in accordance with each disc-type coil, thereby constituting the lamination through holes 10. Moreover, the plurality of coils are formed for each circuit, and they are connected in series or connected in parallel by using the connecting patterns 5. In this embodiment, as compared with the disc-type coil according to the embodiment shown in FIG. 1 to FIG. 21, since a large distance can be assured between the through hole lands 22 on the outer circumferential side and the through hole lands 23 on the inner circumferential side when the insulating substrate of the same size is used, straight portions 21a provided at the center of an annular portion constituting the magnetic circuit of the conductors can be elongated, thereby increasing an output.

Moreover, although the conductor pattern 2 according to this embodiment is just a preferred conformation, the present invention is not restricted thereto. It is needless to say that the present invention can be applied to any other conductor pattern than that shown in the drawings and the number of the disc-type coils to be laminated is not restricted as long as at least two holes 7 configured to form the lamination through holes according to the present invention are provided for each circuit in each disc-type coil, these holes are arranged at the same positions in the laminating direction on the outer side or the inner side of the conductor pattern 2 of the insulating substrate 1 in a state that the plurality of discs are laminated, the leading pattern 3 and the terminating pattern 4 serving as terminal portions for each circuit of the conductor pattern 2 in each disc-type coil are electrically connected to the two lamination holes 7 selected in accordance with each disc-type coil to thereby constitute the lamination through holes 10. Additionally, the conductor pattern 2 is not restricted to three phases and three circuits, and two circuits or four or more circuits can be adopted. Further, the description has been mainly given as to the example where the lamination through holes 10 are connected through the conductor pin 9, but the present invention is not restricted thereto, and electrical conduction can be achieved by soldering the lamination through holes 10 or filling the lamination through holes 10 with solder or a conductive material.

INDUSTRIAL APPLICABILITY

The disc-type coil according to the present invention can be used in the field of electromagnetic induction devices such as a rotor coil or a stator coil in an induction machine like a DC brushless motor, and a thin DC brushless motor having a large output can be realized.

REFERENCE SIGNS LIST 1 insulating substrate
2 conductor pattern
2a, 2b coil half portion
3 leading pattern
4 terminating pattern
5 connecting pattern
6 conductor connection through hole
7 hole configured to form a lamination through hole
9 conductor pin (pin having conducive properties)
10 lamination through hole

The invention claimed is:

1. A coil apparatus that laminates a plurality of disc-type coils each having a conductor pattern constituting coils of at least one circuit on a discoid annular insulating substrate and electrically connects the disc-type coils via lamination through holes, which are configured to achieve electrical conduction with other disc-type coils, to use the plurality of laminated disc-type coils as one coil, wherein the plurality of laminated disc-type coils are disc-type coils of one-kind each having a configuration that the conductor pattern and a leading end and a terminating end for each circuit of the conductor pattern are provided at the same positions and the leading end and the terminating end are connected to the lamination through holes via a leading pattern and a terminating pattern, holes configured to form at least the n+1 lamination through holes for n (n is a positive integer) laminated discs are provided in accordance with each circuit in each disc-type coil and arranged at the same positions in a laminating direction on the outer side or the inner side of the conductor pattern of the insulating substrate in a state that the plurality of discs are laminated, positions of the lamination through holes that connect the disc-type coils to be laminated are variable by just changing the positions of the holes configured to form the lamination through holes on the other side to which the leading pattern and the terminating pattern are connected, and the plurality of disc-type coils of one type constitute an arbitrary circuit.

2. The coil apparatus according to claim 1, wherein the holes configured to form the lamination through holes are congregated in proximity to each other.

3. The coil apparatus according to claim 1, wherein the holes configured to form the lamination through holes are arranged in a flange portion outwardly protruding from an outer circumference of the insulating substrate or a space on the inner circumferential side of the insulating substrate apart from the conductor pattern, and the leading pattern and the terminating pattern are drawn to the flange portion or the space on the inner circumferential side of the insulating substrate.

4. The coil apparatus according to claim 1, wherein the conductor pattern of the disc-type coil constitutes one coil by connecting a plurality of conductors, which extend from the inner circumferential side toward the outer circumferential side or from the outer circumferential side toward the inner circumferential side between through hole lands on the inner circumferential side and through holes on the outer circumferential side that are annularly arranged along the inner circumference and the outer circumference of the annular insulating substrate, to through holes in the through hole lands on the outer circumferential side and the through hole lands on the inner circumferential side to be alternately folded back in a wave pattern between a front surface and a back surface of the insulating substrate.

5. The coil apparatus according to claim 4, wherein each through hole land on the inner circumferential side has an area expanded in a radial direction of the insulating substrate, an extended line of an outline of the through hole land on the inner circumferential side in the radial direction has a wedge shape that coincides with the center of the insulating substrate, each of the conductors is drawn from an outer end portion of the through hole lands on the inner circumferential side in the radial direction, and a plurality of through holes configured to connect the conductor pattern on the front surface with the conductor pattern on the back surface are formed in the through hole land on the inner circumferential side in the radial direction of the insulating substrate.

6. The coil apparatus according to claim 4, wherein the through hole lands on the inner circumferential side of the plurality of conductors constituting the same magnetic pole of the same circuit are arranged to be aligned on a plurality of different concentric circles in the radial direction of the insulating substrate, and a plurality of through holes configured to connect the conductor pattern on the front surface with the conductor pattern on the back surface are formed.

7. The coil apparatus according to claim 5, wherein the conductor pattern of the disc-type coil has a configuration that a plurality of coils including at least one coil connected to the leading pattern and one coil connected to the terminating pattern are formed on one insulating substrate and these coils are connected in series or connected in parallel through a connecting pattern.

8. The coil apparatus according to claim 1, wherein the disc-type coils are laminated through an insulating sheet, and the lamination through holes of the plurality of electrically connected disc-type coils are connected via a pin that pierces the insulating sheet and has conductive properties.

9. The coil apparatus according to claim 1, wherein the lamination through hole connected to the leading pattern and the lamination through hole connected to the terminating pattern are arranged while displacing hole positions one by one in accordance with each disc-type coil, and all the laminated disc-type coils are sequentially connected in series through a pin having conductive properties.

* * * * *